(12) United States Patent
Furukawa et al.

(10) Patent No.: US 11,351,876 B2
(45) Date of Patent: Jun. 7, 2022

(54) VEHICLE POWER SUPPLY SYSTEM

(71) Applicant: Mazda Motor Corporation, Hiroshima (JP)

(72) Inventors: Akihiro Furukawa, Hiroshima (JP); Seiyo Hirano, Hiroshima (JP); Hideki Sanai, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 291 days.

(21) Appl. No.: 16/752,702

(22) Filed: Jan. 27, 2020

(65) Prior Publication Data
US 2020/0247253 A1    Aug. 6, 2020

(30) Foreign Application Priority Data
Feb. 5, 2019    (JP) .............................. JP2019-018623

(51) Int. Cl.
*B60L 53/14*    (2019.01)
*B60L 50/11*    (2019.01)
(Continued)

(52) U.S. Cl.
CPC .............. *B60L 53/14* (2019.02); *B60L 50/11* (2019.02); *B60L 53/53* (2019.02); *B60L 53/55* (2019.02);
(Continued)

(58) Field of Classification Search
CPC ..................................................... B60L 53/14
(Continued)

(56) References Cited

U.S. PATENT DOCUMENTS

| | | | |
|---|---|---|---|
| 6,989,653 B2* | 1/2006 | Iwata | H02M 3/158 320/134 |
| 2010/0231178 A1* | 9/2010 | Handa | H02J 7/0068 320/163 |

(Continued)

FOREIGN PATENT DOCUMENTS

| | | |
|---|---|---|
| DE | 102009028147 A1 | 2/2011 |
| DE | 102015006208 A1 | 12/2015 |
| JP | 2014-231290 A | 12/2014 |

OTHER PUBLICATIONS

Extended European search report dated Jul. 6, 2020, in corresponding European patent Application No. 20154126.5, 10 pages.
(Continued)

*Primary Examiner* — Jerry D Robbins
(74) *Attorney, Agent, or Firm* — Xsensus LLP

(57) ABSTRACT

A vehicle power supply system configured to be charged by an electric vehicle (EV) charging station that performs charging with a voltage equal to or more than a predetermined lower limit voltage. The vehicle power supply system includes a battery having a rated voltage lower than the lower limit voltage; a capacitor electrically connected in series to the battery, wherein a sum of the rated voltage of the battery and a rated voltage of the capacitor is greater than the first voltage; and an interface configured to receive electric power from the EV charging station. The vehicle power supply system also includes circuitry configured to receive electric power from the EV charging station, and charge the battery and the capacitor using the received electric power.

20 Claims, 15 Drawing Sheets

(51) Int. Cl.
    *B60L 53/53*     (2019.01)
    *B60L 53/55*     (2019.01)
    *B60L 53/62*     (2019.01)
    *H02J 7/00*     (2006.01)
    *H02J 7/14*     (2006.01)

(52) U.S. Cl.
    CPC .............. *B60L 53/62* (2019.02); *H02J 7/007* (2013.01); *H02J 7/1438* (2013.01)

(58) Field of Classification Search
    USPC ........................................................ 320/104
    See application file for complete search history.

(56) References Cited

U.S. PATENT DOCUMENTS

| | | |
|---|---|---|
| 2012/0286569 A1 | 11/2012 | Pischke et al. |
| 2014/0368041 A1 | 12/2014 | Tu et al. |
| 2017/0368957 A1* | 12/2017 | Lei ........................ H02J 7/0021 |

OTHER PUBLICATIONS

"Valeo 48V plug-in hybrid: the best of both worlds made affordable", posted on Nov. 19, 2018, CTI symposium, Dec. 7-10, 2020, total 4 pages, Berlin, Germany. URL:https://drivetrain-symposium.world/de/valeo-48v-plug-in-hybrid-the-best-of-both-worlds-made-affordable/[retrieved on Jun. 19, 2020].

* cited by examiner

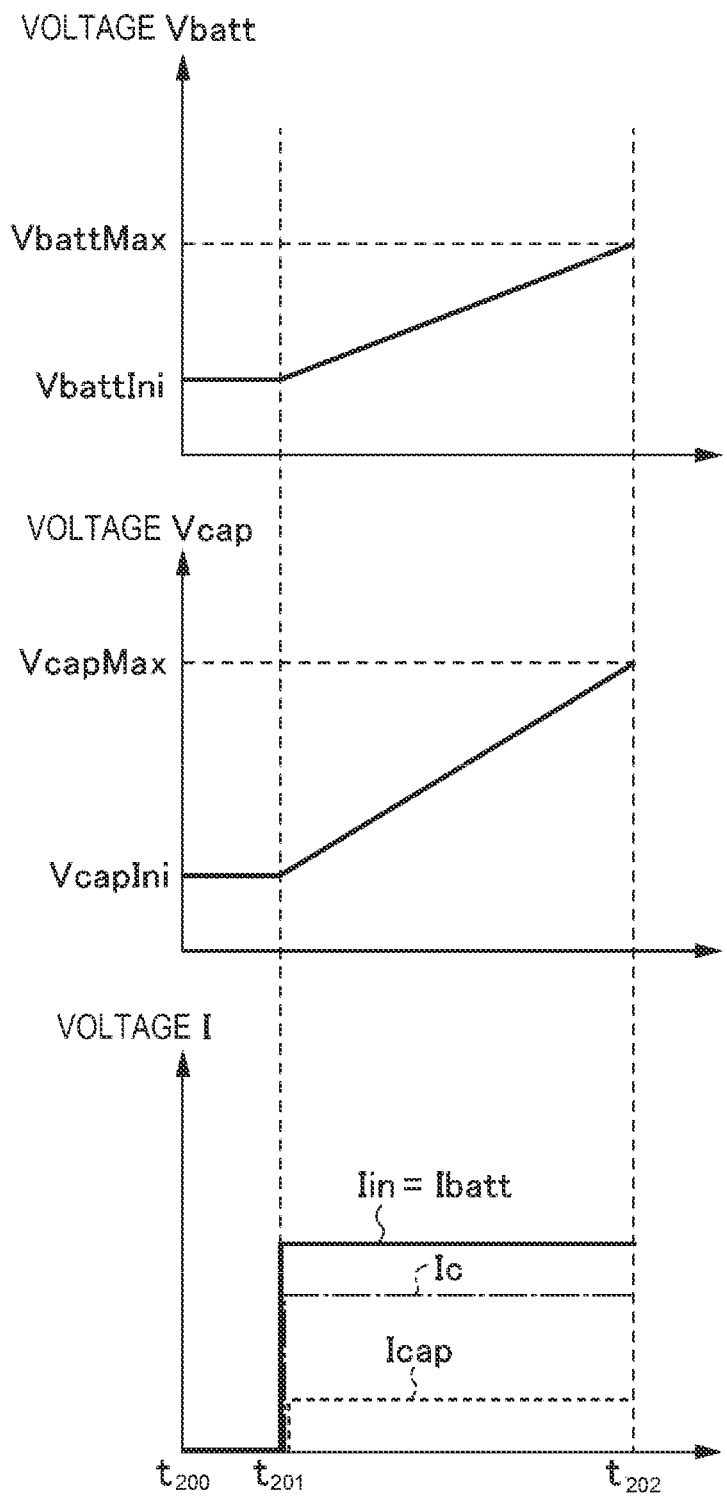

VEHICLE POWER SUPPLY SYSTEM

CROSS-REFERENCE TO RELATED APPLICATION

The present application claims priority to JP 2019-018623, filed Feb. 5, 2019, the entire contents of which are incorporated herein by reference.

TECHNICAL FIELD

The present disclosure relates to a vehicle power supply system, and more particularly, to a vehicle power supply system charged by an external power supply that performs charge with a voltage equal to or more than a predetermined lower limit voltage.

BACKGROUND

JP-A-2014-231290 (PTL 1) describes a plug-in hybrid vehicle. This plug-in hybrid vehicle has a high-power battery used as a power supply for a motor and generator, a 12-V battery used as a power supply for auxiliary equipment of the vehicle, and a capacitor used as a power supply for a starter motor. In addition, when the plug-in hybrid vehicle is charged, a connector plug of an external power supply is connected to a normal external charging port or a fast external charging port. The electric power from the connector plug is supplied to the high-power battery without passing through a voltage converting apparatus or the like with the voltage supplied from the external power supply kept. It should be noted here that the high-power battery operates at several hundred volts and the high-power battery is charged with a voltage of approximately several hundred volts.

PRIOR ART DOCUMENTS

Patent Documents

[Patent document 1] JP-A-2014-231290

SUMMARY

However, when a high voltage battery is used as a power supply to be installed in a vehicle, a highly insulated wire harness and the like corresponding to this high voltage are necessary, thereby causing increase in the weight due to the insulating material for insulating the wire harness and the like and increase in the cost. Accordingly, there is a need to suppress the voltage of a battery to be installed in a vehicle to a low voltage.

On the other hand, a general external power supply such as a charging stand has the voltage range in which charge is allowed and charge cannot be performed outside this voltage range. For example, in the present charging stand, the lower limit of the voltage range in which charge is allowed is set to 50 V, so a voltage lower than this lower limit voltage cannot be used for charge. Accordingly, when the rated voltage of the battery to be installed in the vehicle is equal to or less than the lower limit voltage, the battery cannot be directly charged with the electric power supplied from the charging stand. To charge a battery with the rated voltage lower than such a lower limit voltage, the power supply system of the vehicle needs to have a voltage conversion apparatus for charge so as to charge the battery while converting the voltage. However, there is a problem with this structure in that a special voltage converting apparatus for charge is necessary and the charge current for the battery is limited by the current supply capability of the voltage conversion apparatus for charge. This cannot obtain a sufficient advantage even when a battery with a low rated voltage is adopted.

Accordingly, the inventors of the present disclosure identified novel configuration for a vehicle power supply system that can be charged more effectively by an external power supply while using a battery with a low rated voltage.

Means for Solving the Problem

According to the present disclosure, there is provided a vehicle power supply system charged by an external power supply that performs charge with a voltage equal to or more than a predetermined lower limit voltage, the vehicle power supply system including a battery having a rated voltage lower than the lower limit voltage; a capacitor electrically connected in series to the battery; and a power feeding device that receives electric power from the external power supply and charges the battery and the capacitor, in which the capacitor is configured so that a sum of the rated voltage of the battery and a rated voltage of the capacitor is higher than the lower limit voltage.

According to the present disclosure configured as described above, since the rated voltage of the battery is lower than the predetermined lower limit voltage, it is not possible to charge the battery by directly connecting the external power supply to both terminals of the battery. According to the present disclosure configured as described above, the battery and the capacitor are electrically connected in series so that the total of the rated voltage of the battery and the rated voltage of the capacitor is higher than the lower limit voltage. As a result, since the external power supply can be directly connected to the battery and the capacitor connected in series, the battery having a lower rated voltage can be charged effectively.

In the present disclosure, preferably, the capacitor is configured so that the rated voltage of the capacitor is higher than the rated voltage of the battery.

According to the present disclosure configured as described above, since the rated voltage of the capacitor is higher than the rated voltage of the battery, the rated voltage of the battery can be greatly raised by the capacitor connected in series, thereby enabling the use of a battery having a lower rated voltage.

In the present disclosure, preferably, the battery and the capacitor are connected in series by connecting a positive terminal of the battery and a negative terminal of the capacitor to each other.

According to the present disclosure configured as described above, since the positive terminal of the battery and the negative terminal of the capacitor are connected to each other, the battery and the capacitor can be charged by disposing the external power supply between the positive terminal of the capacitor and the negative terminal of the battery. In addition, by setting the negative terminal of the battery to the ground potential of the vehicle, it is possible to drive a load drivable at a low voltage using only the electric power stored in the battery.

In the present disclosure, preferably, electric charge storable in the capacitor is less than electric charge storable in the battery.

According to the present disclosure configured as described above, the inter-terminal voltage of the capacitor can be increased using relatively low electric charge since the electric charge storable in the capacitor is less than the electric charge storable in the battery, that is, the voltage can be greatly raised using relatively low electric charge.

In the present disclosure, preferably, the vehicle power supply system further includes a DC-to-DC converter electrically connected to the battery and the capacitor.

According to the present disclosure configured as described above, since the DC-to-DC converter is connected to the battery and the capacitor, electric charge can be exchanged between the battery and the capacitor. Accordingly, the amounts of electric charge stored in the battery and the capacitor can be adjusted according to the use situation of the vehicle power supply system, thereby achieving the appropriate power supply structure according to the use situation.

In the present disclosure, preferably, the power feeding device is connected to the external power supply via an electric cable.

According to the present disclosure configured as described above, since the external power supply is connected to the power feeding device via the electric cable, the external power supply can charge the battery and the capacitor in a very simple structure.

In the vehicle power supply system according to the present disclosure, even the battery having a low rated voltage can be effectively charged by the external power supply.

BRIEF DESCRIPTION OF THE DRAWINGS

FIG. 15 illustrates changes in the inter-terminal voltages and the charge current during charge from the external power supply in the vehicle power supply system according to the third embodiment of the present disclosure.

DETAILED DESCRIPTION

Next, embodiments of the present disclosure will be described with reference to the attached drawings.

Figure 1:
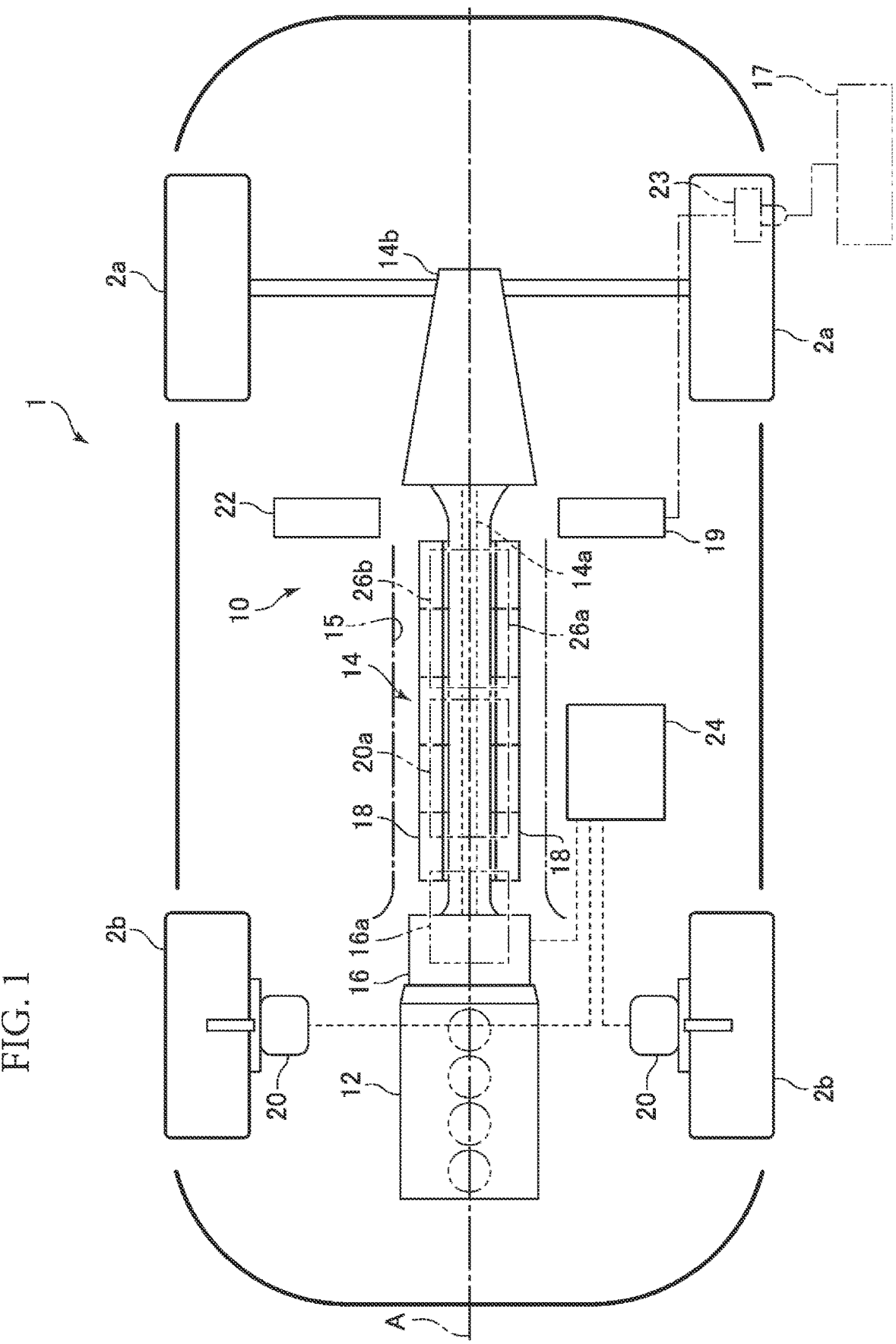
FIG. 1 illustrates a layout of a vehicle having a vehicle power supply system according to a first embodiment of the present disclosure.

FIG. 1 illustrates a layout of a vehicle having a vehicle power supply system according to a first embodiment of the present disclosure.

As illustrated in FIG. 1, a vehicle 1 having a vehicle power supply system 10 according to the first embodiment of the present disclosure is a so-called an FR (front-engine/rear-drive) vehicle that includes an engine 12, which is an internal combustion engine, in the front part (ahead of the driver's seat) of the vehicle and drives a pair of left and right rear wheels 2a, which are main driving wheels. In addition, as described later, the rear wheels 2a are also driven by a main driving motor and a pair of left and right front wheels 2b, which are sub-driving wheels, is driven by sub-driving motors, which are in-wheel motors.

That is, the vehicle 1 includes the engine 12 that drives the rear wheels 2a as a vehicle driving device, a power transmission mechanism 14 that transmits a driving force to the rear wheels 2a, a main driving motor 16 that drives the rear wheels 2a, sub-driving motors 20 that drive the front wheels 2b, and a control device 24. In addition, the vehicle 1 has an inverter 16a that converts a DC voltage to an AC voltage and drives the main driving motor 16 and an inverter 20a that converts a DC voltage to an AC voltage and drives the sub-driving motors 20.

In addition, the vehicle power supply system 10 according to the first embodiment of the present disclosure installed in the vehicle 1 includes a battery 18, a capacitor 22, and a charging device 19 and a power feeding port 23 that function as a power feeding device for receiving electric power from an external power supply 17 and charging the battery 18 and the capacitor 22. The specific structure of the vehicle power supply system 10 according to the embodiment will be described later.

The engine 12 is an internal combustion engine that generates a driving force for the rear wheels 2a, which are the main driving wheels of the vehicle 1. In the embodiment, an inline four-cylinder engine is adopted as the engine 12 and the engine 12 disposed in the front part of the vehicle drives the rear wheels 2a via the power transmission mechanism 14.

The power transmission mechanism 14 transmits the driving forces generated by the engine 12 and the main driving motor 16 to the rear wheels 2a, which are main driving wheels. As illustrated in FIG. 1, the power transmission mechanism 14 includes a propeller shaft 14a, which is a power transmission shaft connected to the engine 12 and the main driving motor 16, and a transmission 14b, which is a shifting gearbox.

The main driving motor 16 is an electric motor that generates a driving force for the main driving wheels, and disposed behind the engine 12 adjacently to the engine 12 on the vehicle body of the vehicle 1. In addition, the inverter 16a is disposed adjacently to the main driving motor 16 and the inverter 16a converts a DC voltage of the battery 18 to an AC voltage and supplies the AC voltage to the main driving motor 16. In addition, as illustrated in FIG. 1, the main driving motor 16 is connected in series to the engine 12 and a driving force generated by the main driving motor 16 is also transmitted to the rear wheels 2a via the power transmission mechanism 14. In addition, in the embodiment, a 25-kW permanent magnet motor (permanent magnet synchronous motor) driven by 48 V is adopted as the main driving motor 16.

The sub-driving motors 20 are provided in the front wheels 2b to generate driving forces for the front wheels 2b, which are sub-driving wheels. In addition, the sub-driving motors 20 are in-wheel motors and are accommodated in the front wheels 2b, respectively. In addition, the DC voltage of the capacitor 22 is converted to an AC voltage by the inverter 20a disposed in a tunnel portion 15 and the AC voltage is supplied to the sub-driving motors 20. Furthermore, in the embodiment, the sub-driving motors 20 do not have speed reducers as speed reduction mechanisms, and the driving forces of the sub-driving motors 20 are directly transmitted to the front wheels 2b, and the wheels are directly driven. In addition, in the embodiment, 17-kW induction motors are adopted as the sub-driving motors 20.

The battery 18 is a storage device in which electric energy for mainly operating the main driving motor 16 is stored. Furthermore, in the embodiment, a 3.5 kWh/48 V lithium ion battery (LIB) is used as the battery 18.

The capacitor 22 can store the electric power regenerated by the sub-driving motors 20. As described later, the capacitor 22 is disposed at a position substantially symmetrical with the plug-in type charging device 19 in the rear part of the vehicle 1 and supplies electric power to the sub-driving motors 20 provided in the front wheels 2b of the vehicle 1. The sub-driving motors 20 driven mainly by the electric power stored in the capacitor 22 is driven by a higher voltage than in the main driving motor 16.

The charging device 19 is electrically connected to the battery 18 and the capacitor 22 and charges the battery 18 and the capacitor 22 with the electric power supplied from the external power supply 17 such as a charging stand via the power feeding port 23. The external power supply 17 such as a charging stand generally performs charge with a voltage equal to or more than a predetermined lower limit voltage (for example, 50 V) and the vehicle power supply system 10 according to the embodiment supports this lower limit voltage. Non-limiting examples of the external power supply include electric vehicle (EV) charging stations, electric recharging point, charging point, charge point, electronic charging station (ECS) and electric vehicle supply equipment (EVSE), and are elements that supply electric energy for the recharging of plug-in electric vehicles—including electric cars, neighborhood electric vehicles and plug-in hybrids. A specific example of this external power supply is the Society of Automobile Engineers (SAE) J1772 (J plug), which has a lower limit voltage of 50 V and an upper limit voltage of 1000 V.

The power feeding port 23 is a connector provided on the rear side surface of the vehicle 1 and electrically connected to the charging device 19. The connector of the power feeding port 23 is connectable to the plug of an electric cable 17a extending from the external power supply 17 such as a charging stand, and electric power is supplied to the charging device 19 via the power feeding port 23. As described above, the vehicle power supply system 10 according to the embodiment can charge the battery 18 and the capacitor 22 by connecting the external power supply 17 that supplies DC electric power to the power supply port 23 via the electric cable 17a.

The control device 24 controls the engine 12, the main driving motor 16, and the sub-driving motors 20 so as to perform an electric motor travel mode and an internal combustion engine travel mode. Specifically, the control device 24 may include a microprocessor, a memory, an interface circuit, programs for operating these components (not illustrated), and the like.

Figure 2:
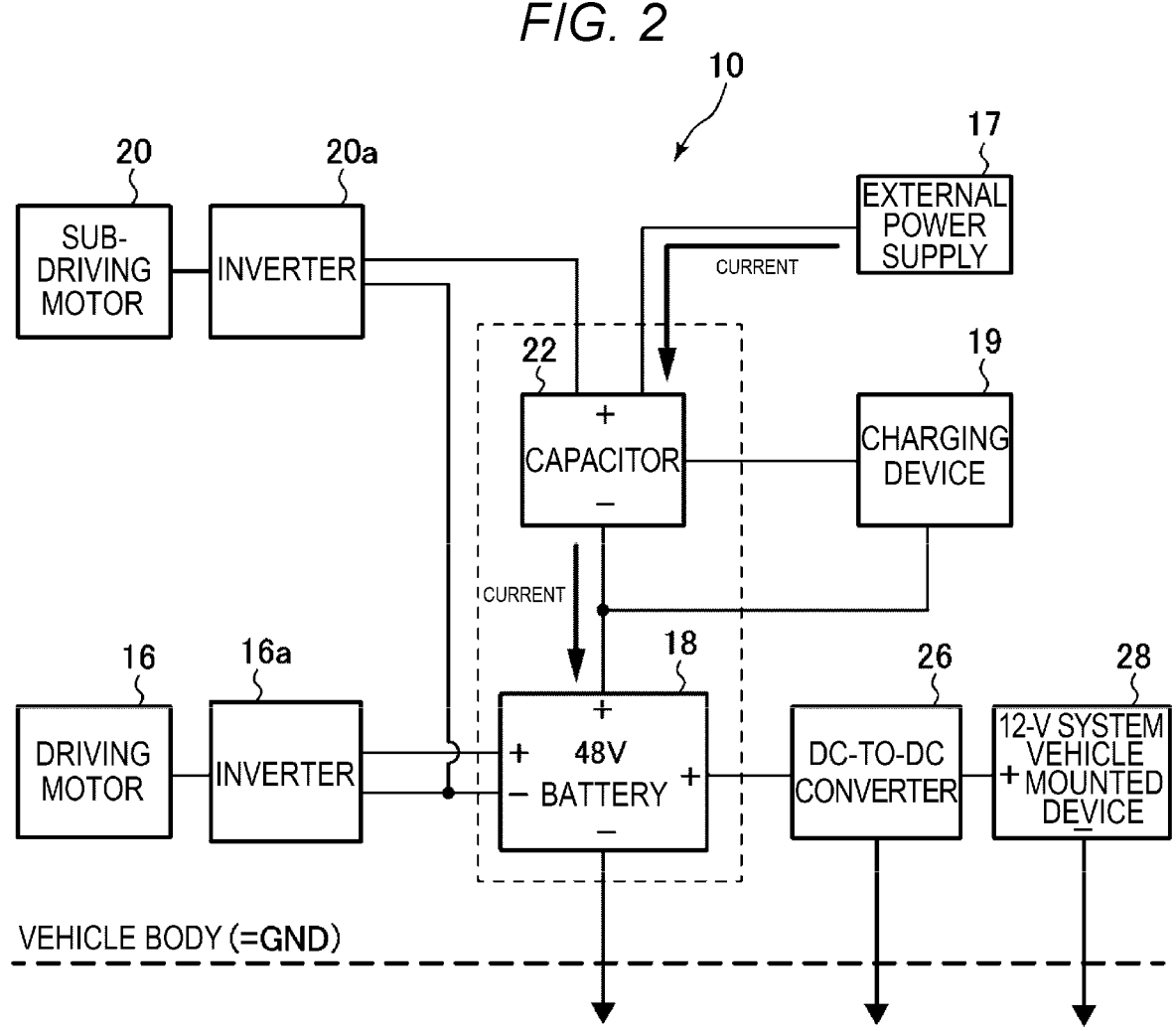
FIG. 2 is a block diagram of the vehicle power supply system according to the first embodiment of the present disclosure and schematically illustrates a flow of current during charge by an external power supply.
Figure 3:
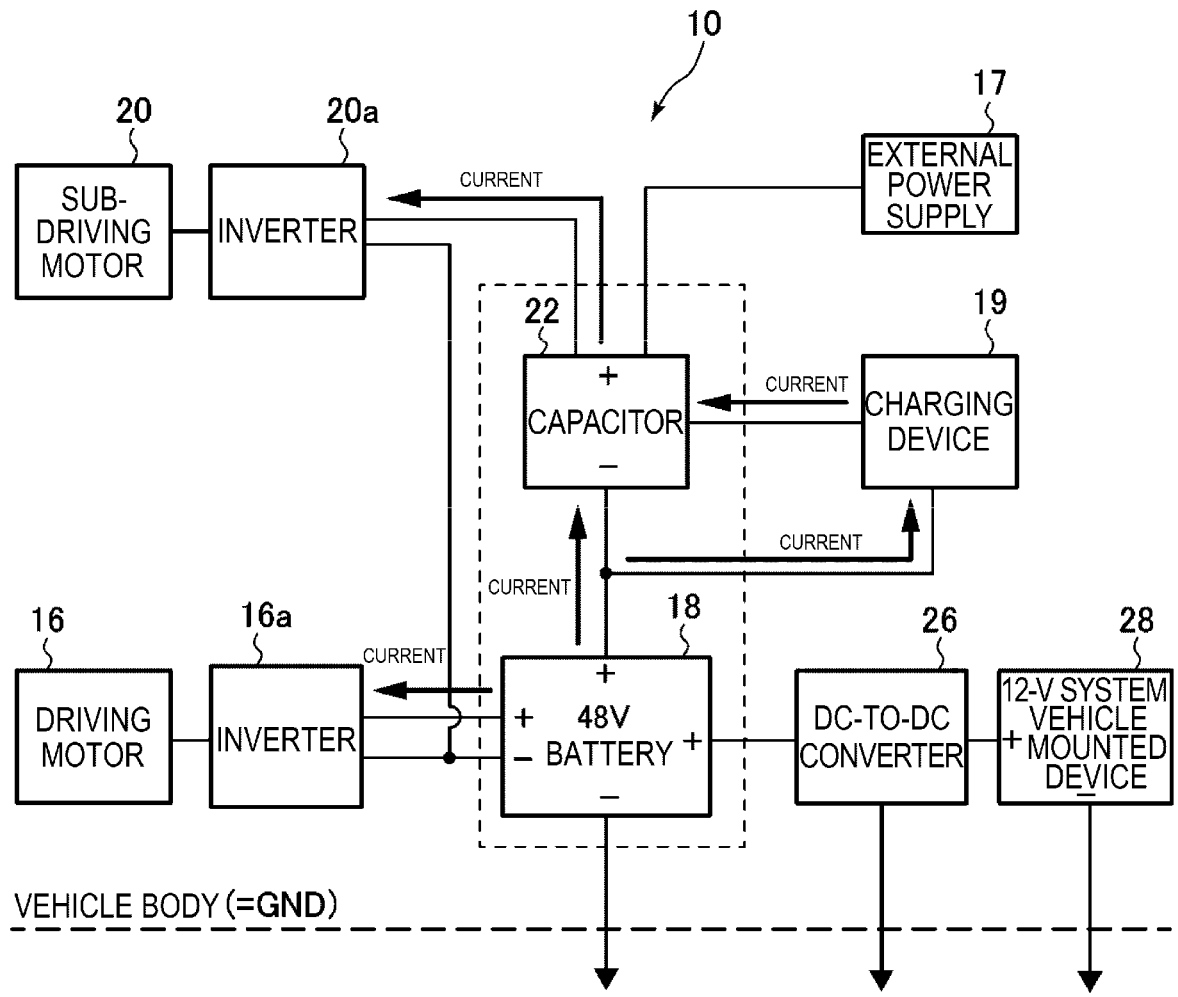
FIG. 3 is a block diagram of the vehicle power supply system according to the first embodiment of the present disclosure and schematically illustrates a flow of current when a main driving motor and sub-driving motors are driven.
Figure 4:
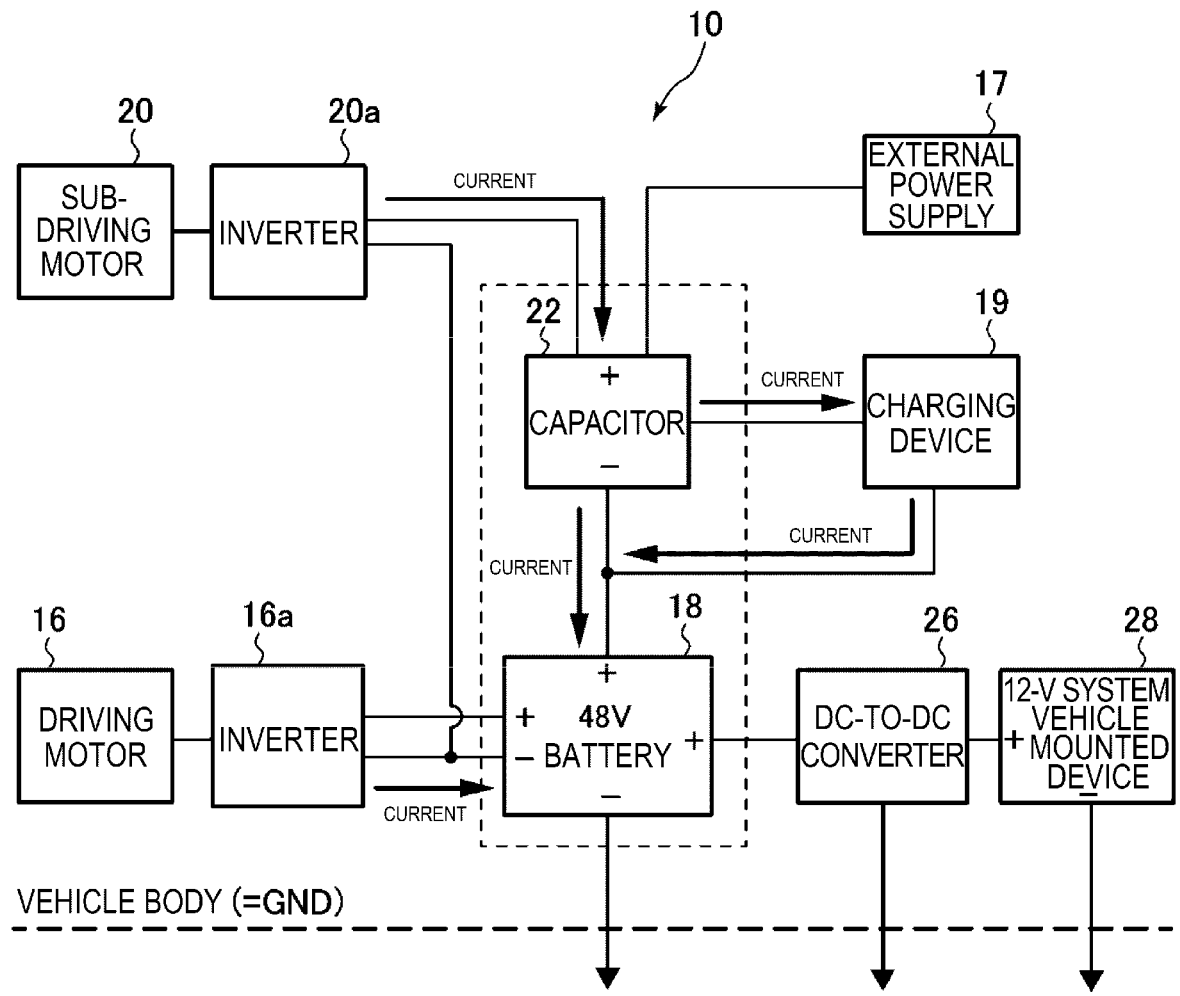
FIG. 4 is a block diagram of the vehicle power supply system according to the first embodiment of the present disclosure and schematically illustrates a flow of current during charge with electric power regenerated by the sub-driving motors.

Next, the structure and the operation of the vehicle power supply system 10 according to the first embodiment of the present disclosure will be schematically described with reference to FIGS. 2 to 4. FIG. 2 is a block diagram of the vehicle power supply system 10 according to the first embodiment of the present disclosure and schematically illustrates a flow of current during charge by the external power supply 17. FIG. 3 is a block diagram of the vehicle power supply system 10 according to the first embodiment of the present disclosure and schematically illustrates a flow of current when the main driving motor 16 and the sub-driving motors 20 are driven. FIG. 4 is a block diagram of the vehicle power supply system 10 according to the first embodiment of the present disclosure and schematically illustrates a flow of current during charge with electric power regenerated by the sub-driving motors 20.

First, as illustrated in FIG. 2, the capacitor 22 and the battery 18 are connected in series in the vehicle power supply system 10 according to the embodiment. That is, in the embodiment, the battery 18 and the capacitor 22 are electrically connected in series by connecting the positive terminal of the battery 18 and the negative terminal of the capacitor 22 to each other. In addition, the negative terminal of the battery 18 is connected to the body ground of the vehicle 1. In the embodiment, the rated voltage of the battery 18 is set to 48 V, which is lower than the lower limit voltage (50 V) of the external power supply 17, and the rated voltage of the capacitor 22 is set to 72 V, which is higher than the lower limit voltage of the external power supply 17. It should be noted here that the rated voltage of the battery 18 means the maximum value of the operating voltage under general conditions and the rated voltage of the capacitor 22 represents the maximum voltage given to the capacitor 22 in this specification. In addition, the average operating voltage when a battery is discharged under general conditions is referred to as the nominal voltage of the battery. In addition, although the rated voltage of the battery 18 is set to a value lower than the rated voltage of the capacitor 22, the electric charge (coulomb) storable in the battery 18 is more than the electric charge storable in the capacitor 22.

Since the rated voltage of the battery 18 is set to a value lower than the lower limit voltage in the embodiment as described above, the external power supply 17 cannot directly charge the battery 18 without converting the voltage. In contrast, the external power supply 17 can directly charge the battery 18 and the capacitor 22 connected in series without converting the voltage. That is, since the voltage (voltage between the negative electrode of the battery 18 and the positive electrode of the capacitor 22) of the capacitor 22 connected in series to the battery 18 is equal to or more than the lower limit voltage, the external power supply 17 can charge the battery 18 and the capacitor 22. Accordingly, as illustrated in FIG. 2, during charge by the external power supply 17, the DC current from the external power supply 17 flows to the capacitor 22 and the battery 18 and charges the capacitor 22 and the battery 18. In addition, the charging device 19 is connected to the capacitor 22 and the battery 18, respectively, to control the charge of the capacitor 22 and the battery 18. The specific structure and operation of the charging device 19 will be described later.

It should be noted here that the charging device 19 may have a DC-to-DC converter so as to lower the voltage of the electric charge stored in the capacitor 22 and charge the battery 18 with the voltage or raise the voltage of the electric charge stored in the battery 18 and charge the capacitor 22 with the voltage. Since the charging device 19 has the DC-to-DC converter connected to the battery 18 and the capacitor 22 as described above, electric charge can be exchanged between the battery 18 and the capacitor 22. Therefore, the amount of electric charge stored in the battery 18 and the capacitor 22 can be adjusted according to the use situation of the vehicle power supply system 10.

Next, as illustrated in FIG. 3, electric power is supplied via different paths to drive the main driving motor 16 and the sub-driving motors 20. First, since the main driving motor 16 is driven by a relatively low voltage of about 48 V, electric power is directly supplied from the battery 18 to the inverter 16*a* for the main driving motor 16. That is, the positive terminal and the negative terminal of the battery 18 are connected to the inverter 16*a* and the DC voltage of the battery 18 is applied to the inverter 16*a*. In contrast, since the sub-driving motors 20 are driven by a relatively high voltage of about 120 V, electric power is supplied from the battery 18 and the capacitor 22 to the inverter 20*a* for the sub-driving motors 20. That is, the positive terminal of the capacitor 22 and the negative terminal of the battery 18 are connected to the inverter 20*a* and the total of the voltage of the battery 18 and the voltage of the capacitor 22 is applied to the inverter 20*a*. In addition, when the electric charge of the capacitor 22 is discharged and the inter-terminal voltage of the capacitor 22 is lowered, the capacitor 22 is charged with the electric charge stored in the battery 18 by the charging device 19. With this, the inter-terminal voltage of the capacitor 22 is raised and the voltage required to drive the sub-driving motors 20 is obtained. On the other hand, the electric power obtained by lowering the output voltage of the battery 18 through the DC-to-DC converter 26 is supplied to a 12-V system vehicle mounted device 28 installed in the vehicle 1.

Furthermore, as illustrated in FIG. 4, when the vehicle is braked, the kinetic energy of the vehicle 1 is regenerated by the main driving motor 16 to generate electric power. The output voltage from the main driving motor 16 is applied between the positive terminal and the negative terminal of the battery 18 and the battery 18 is charged. In addition, when the vehicle 1 is braked, the sub-driving motors 20 also perform regeneration to generate electric power. The output voltages from the sub drive motors 20 are applied between the positive terminal of the capacitor 22 and the negative terminal of the battery 18, and the battery 18 and the capacitor 22 are charged. It should be noted here that, when the electric power regenerated by the sub-driving motors 20 is large and the inter-terminal voltage of the capacitor 22 is raised to a predetermined value or more, the charging device 19 discharges the electric charge stored in the capacitor 22 and charges the battery 18 with the electric charge.

Next, the specific structure and operation of the vehicle power supply system 10 according to the first embodiment of the present disclosure will be described with reference to FIGS. 5 to 11.

Figure 5:
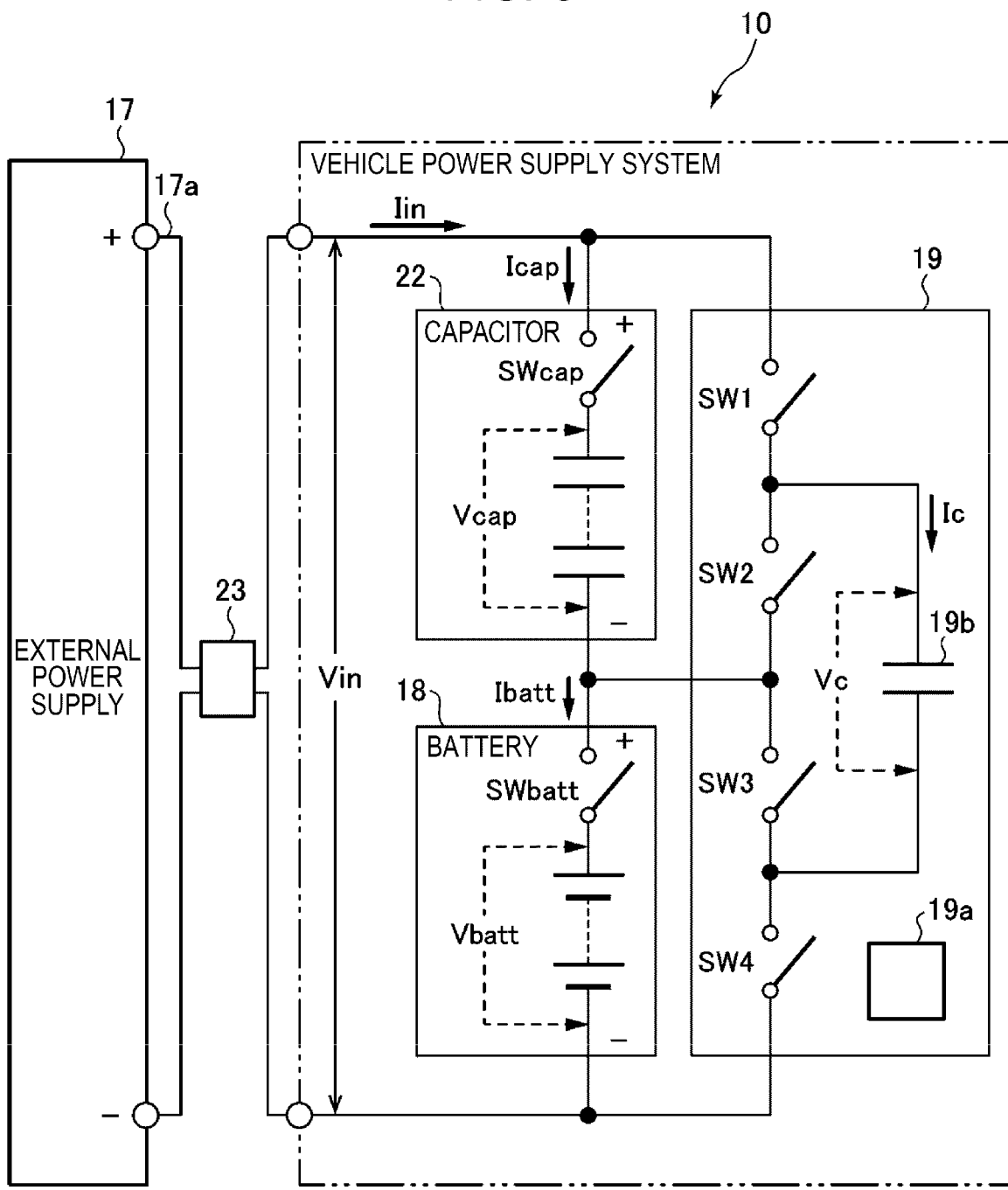
FIG. 5 illustrates the circuit of the vehicle power supply system according to the first embodiment of the present disclosure.
Figure 6:
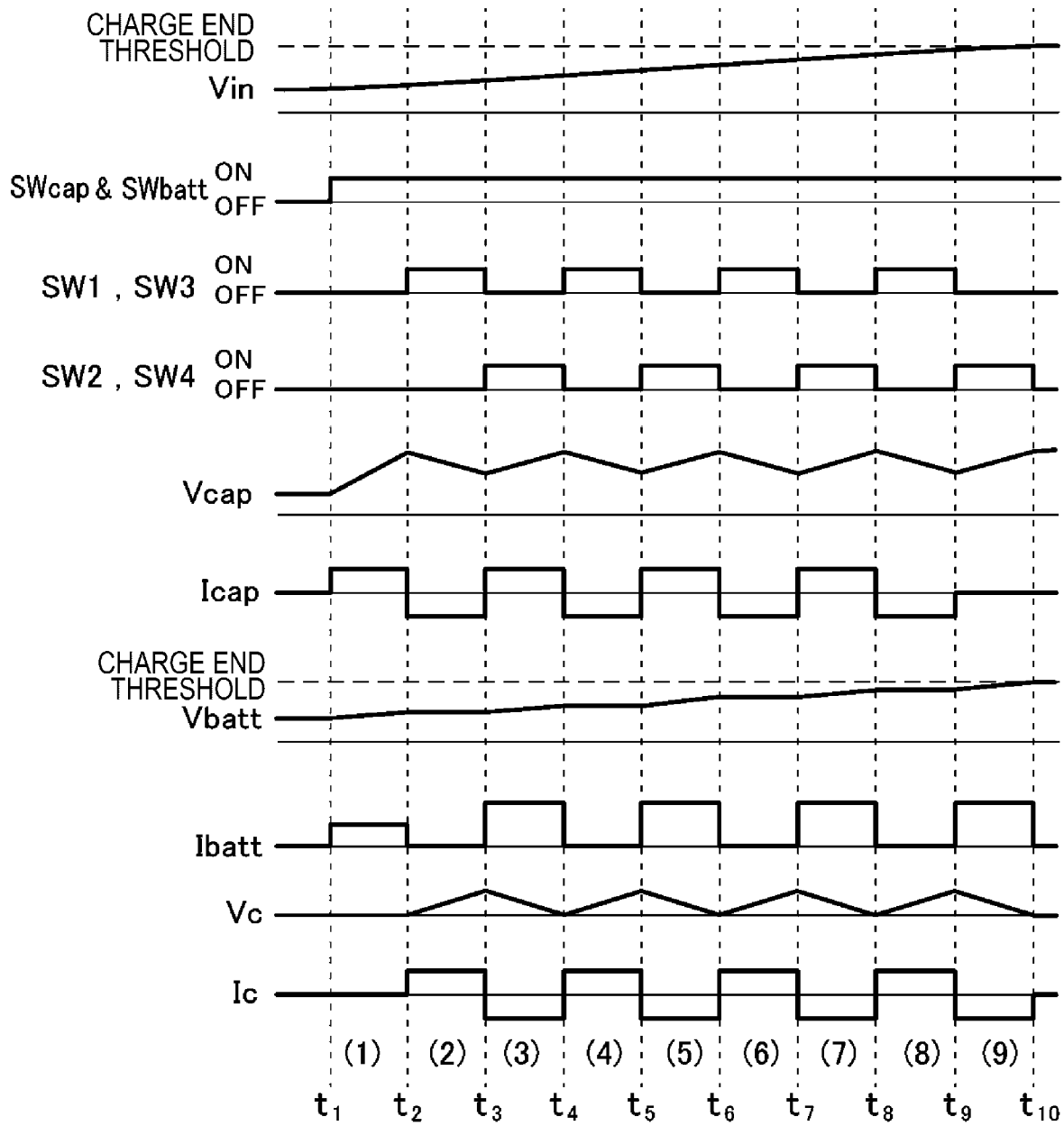
FIG. 6 is a time chart illustrating the operation when the vehicle power supply system according to the first embodiment of the present disclosure is charged by the external power supply.
Figure 7:
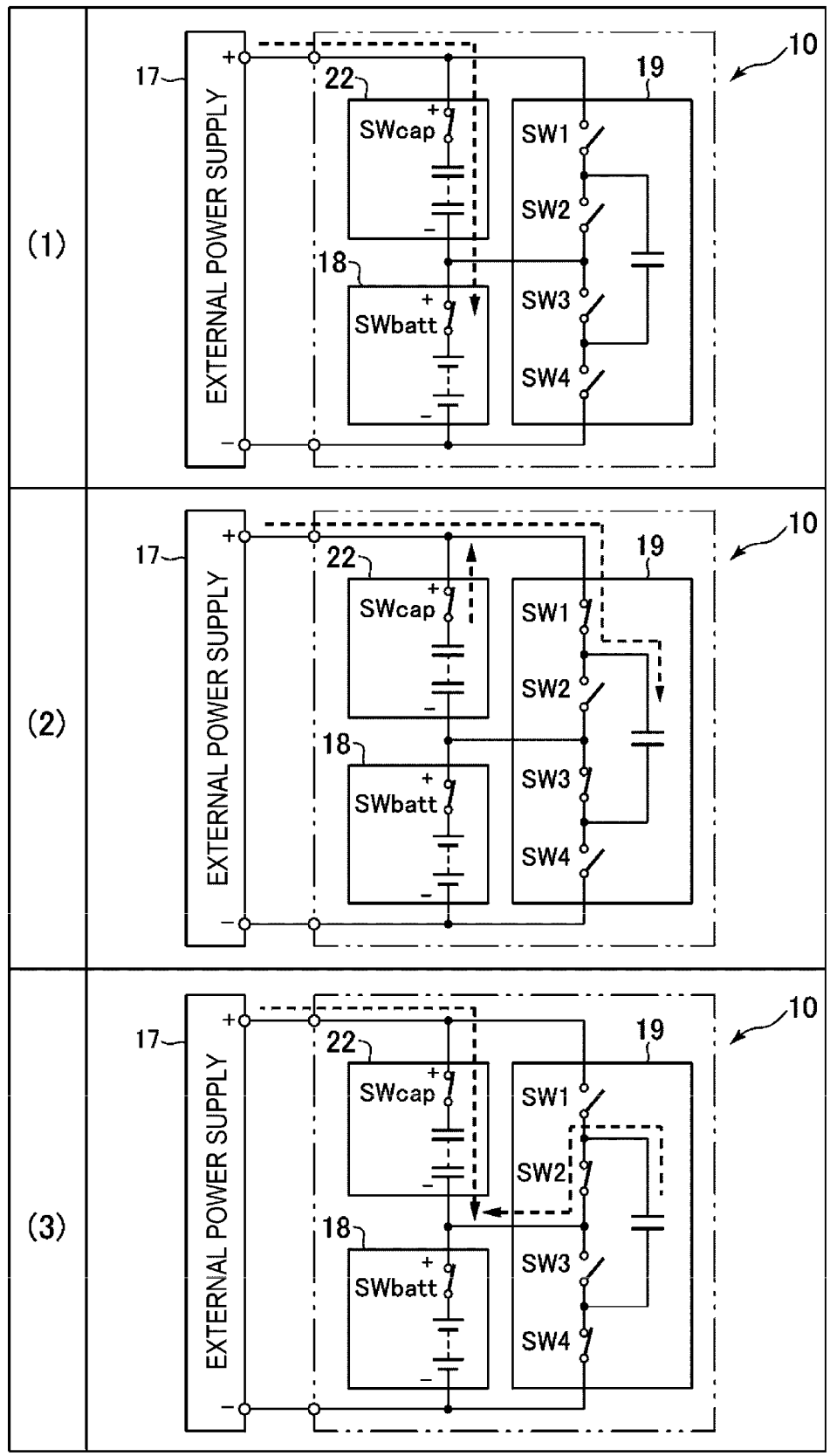
FIG. 7 illustrates the state of the circuit when the vehicle power supply system according to the first embodiment of the present disclosure is charged by the external power supply.
Figure 8:
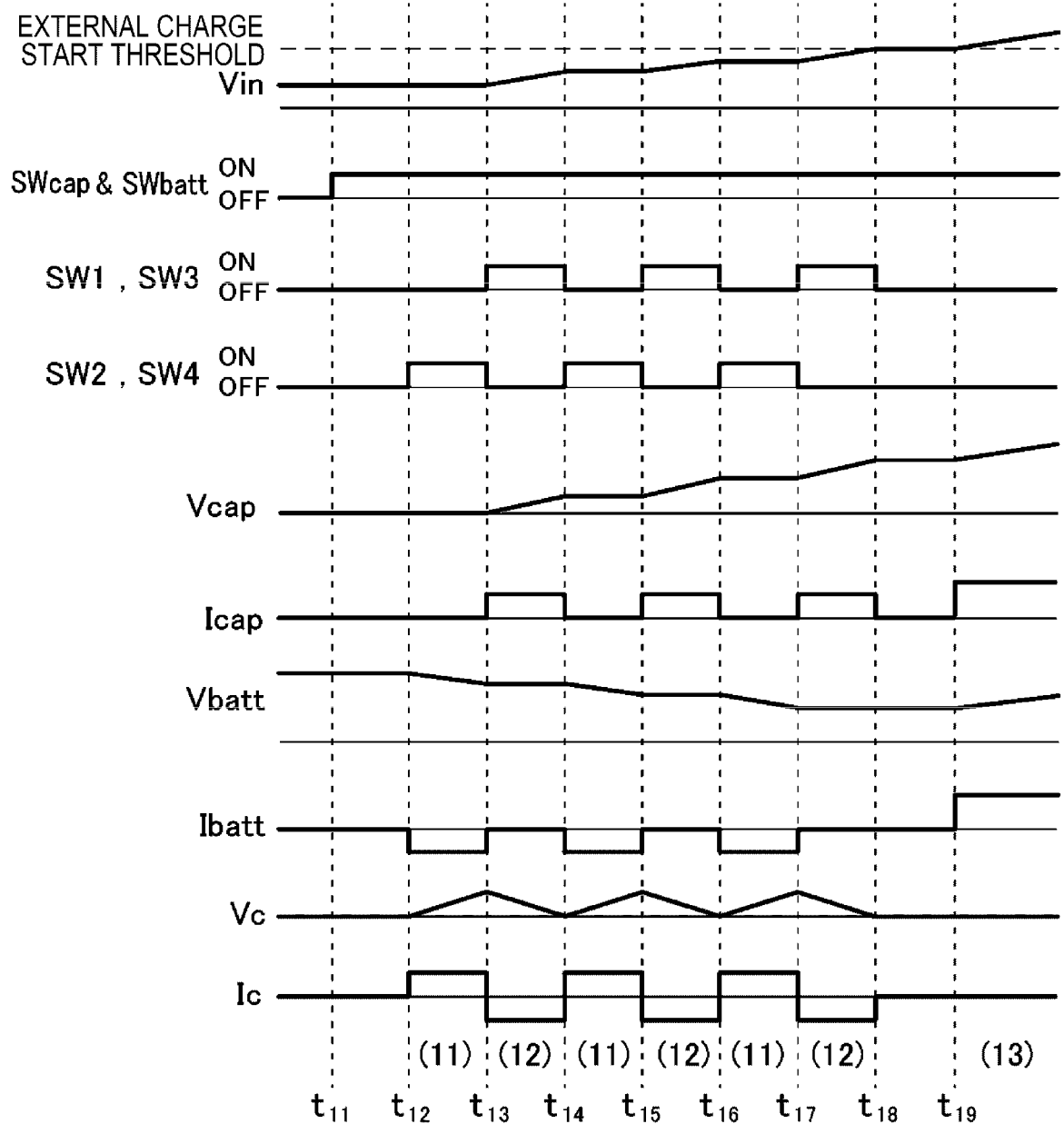
FIG. 8 is a time chart illustrating the operation when a capacitor is charged in the vehicle power supply system according to the first embodiment of the present disclosure.
Figure 9:
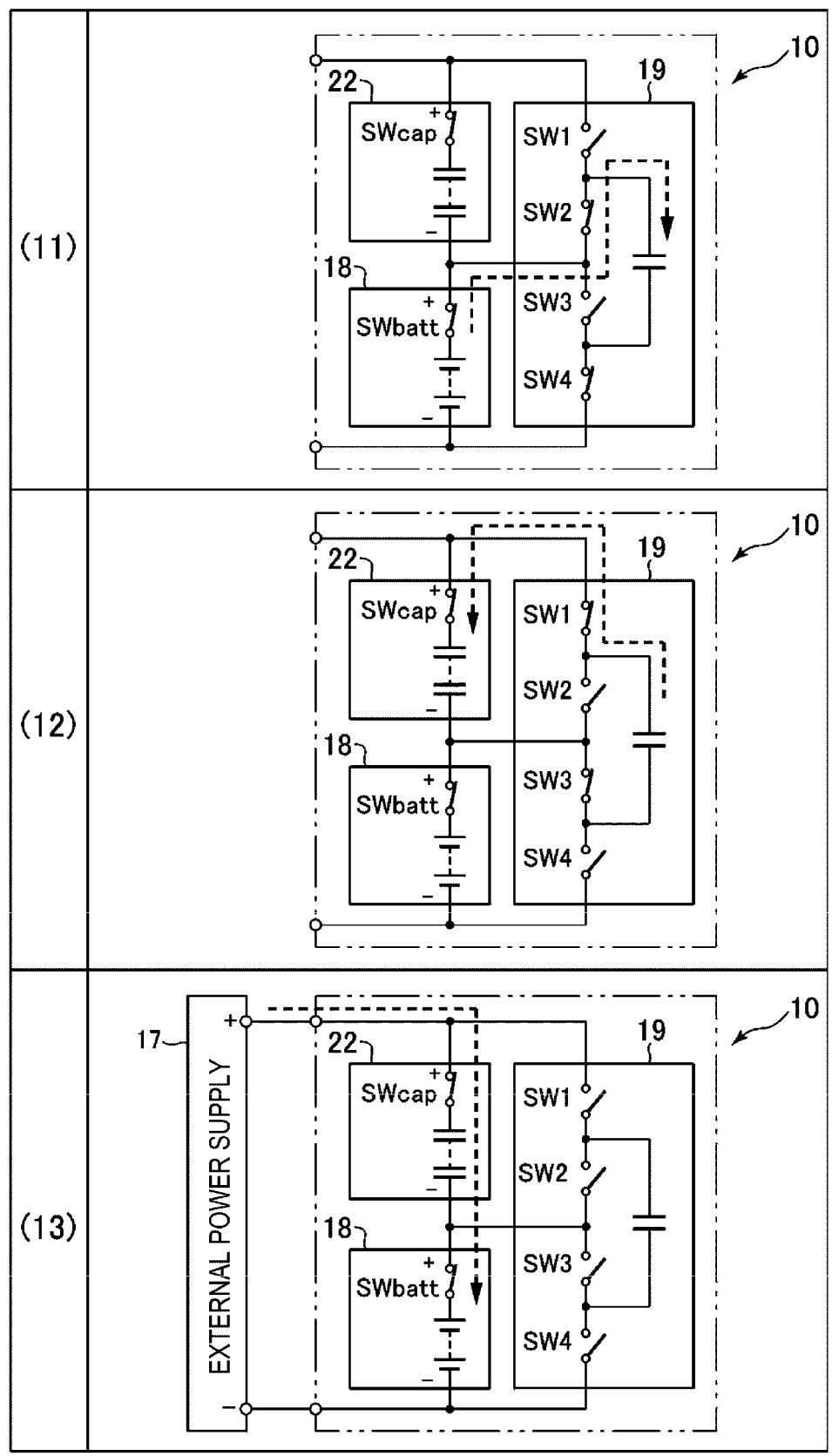
FIG. 9 illustrates the state of the circuit when the capacitor is charged in the vehicle power supply system according to the first embodiment of the present disclosure.
Figure 10:
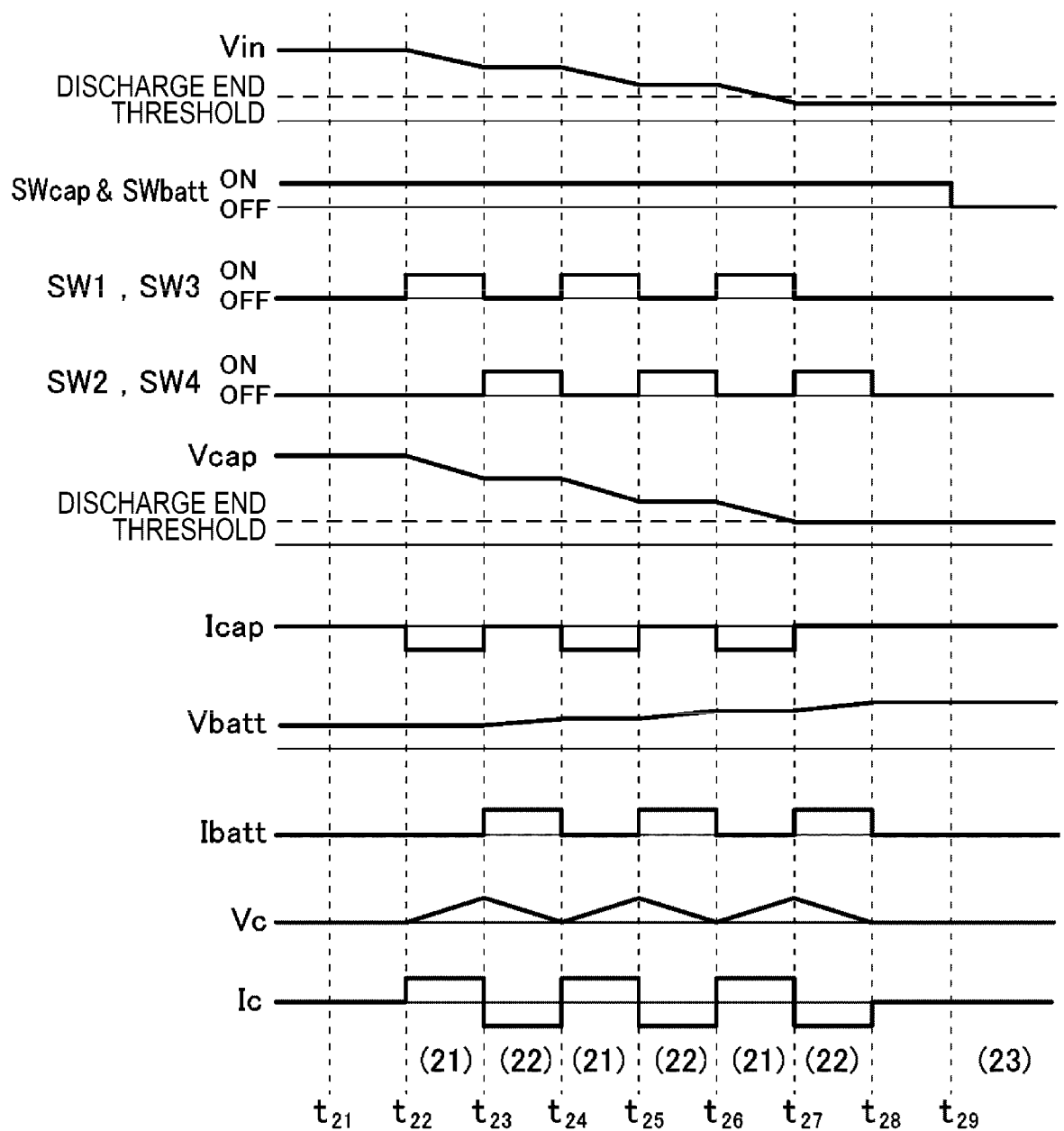
FIG. 10 is a time chart illustrating the operation when the battery is charged with the electric charge of the capacitor in the vehicle power supply system according to the first embodiment of the present disclosure.
Figure 11:
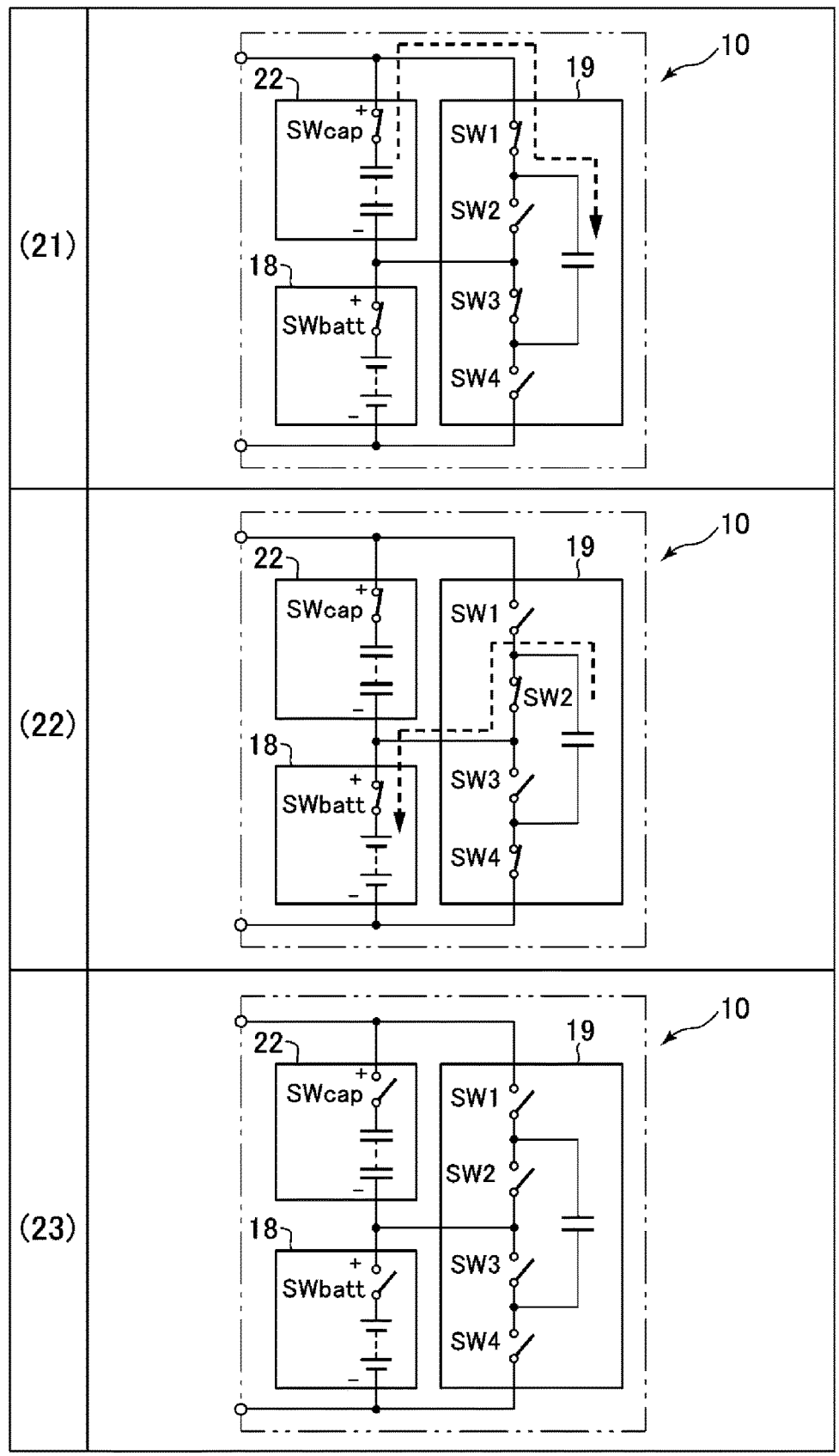
FIG. 11 illustrates the state of the circuit when the battery is charged with the electric charge of the capacitor in the vehicle power supply system according to the first embodiment of the present disclosure.

FIG. 5 illustrates the circuit of the vehicle power supply system 10 according to the embodiment. FIG. 6 is a time chart illustrating the operation when the vehicle power supply system 10 according to the embodiment is charged by the external power supply. FIG. 7 illustrates the state of the circuit when the vehicle power supply system 10 according to the embodiment is charged by the external power supply. FIG. 8 is a time chart illustrating the operation when the capacitor is charged in the vehicle power supply system 10 according to the embodiment. FIG. 9 illustrates the state of the circuit when the capacitor is charged in the vehicle power supply system 10 according to the embodiment. FIG. 10 is a time chart illustrating the operation when the battery is charged with the electric charge of the capacitor in the vehicle power supply system 10 according to the embodiment. FIG. 11 illustrates the state of the circuit when the battery is charged with the electric charge of the capacitor in the vehicle power supply system 10 according to the embodiment.

As illustrated in FIG. 5, the vehicle power supply system 10 according to the embodiment is connected to the electric cable 17*a* of the external power supply 17 via the power feeding port 23 so that the vehicle power supply system 10 can be charged by the external power supply 17. In addition, the vehicle power supply system 10 includes the battery 18, the capacitor 22, and the charging device 19 and the battery 18 and the capacitor 22 are charged with electric power from the external power supply 17. Accordingly, in the embodiment, the charging device 19 and the power feeding port 23 function as a power feeding device for the battery 18 and the capacitor 22.

In addition, as described above, the battery 18 and the capacitor 22 are electrically connected in series by connecting the positive terminal of the battery 18 to the negative terminal of the capacitor 22. In addition, a switch SWbatt is connected to the positive terminal of the battery 18 and a switch SWcap is connected to the positive terminal of the capacitor 22 so as to switch between the connection and disconnection of the battery 18 and the capacitor 22.

The charging device 19 is connected in parallel to the battery 18 and the capacitor 22 connected in series. In addition, the charging device 19 includes four switches connected in series in the following order: switches SW1, SW2, SW3, and SW4. One end of the switch SW1 is connected to the positive terminal of the capacitor 22 and one end of the switch SW4 is connected to the negative terminal of the battery 18. In addition, the connection point between the switches SW2 and SW3 is connected to the connection point between the battery 18 and the capacitor 22. The opening and closing of the switches SW1 to SW4 and the switches SWbatt and SWcap provided in the battery 18 and capacitor 22 are controlled by a charge controller 19*a* included in the charging device 19. Specifically, the charge controller 19*a*, which is a controller, may include a microprocessor, a memory, an interface circuit, programs for operating these components (not illustrated), and the like. In addition, a charge capacitor 19*b* is connected between the connection point between the switches SW1 and SW2 and the connection point between the switches SW3 and SW4.

It should be noted here that semiconductor switches are adopted as these switches in the embodiment, but relays having mechanical contacts may also be used as these switches.

Next, the charging of the battery 18 and the capacitor 22 by the external power source 17 will be described with reference to FIGS. 6 and 7. It should be noted here that FIG. 6 and FIG. 7 illustrate the case in which the total of the inter-terminal voltage of the battery 18 and the inter-terminal voltage of the capacitor 22 is equal to or more than the lower limit voltage above which charge by the external power supply 17 is enabled.

FIG. 6 is a time chart illustrating the operation of the vehicle power supply system 10 when the external power supply 17 charges the battery 18 and the capacitor 22. FIG. 6 illustrates the voltage Vin input from the external power supply 17, the open-close states of the switches SWbatt and SWcap, the open-close states of the switches SW1 and SW3, and the open-close states of the switches SW2 and SW4. FIG. further illustrates an inter-terminal voltage Vcap (voltage between the positive terminal and the negative terminal of the capacitor 22) of the capacitor 22, current Icap flowing through the capacitor 22, an inter-terminal voltage Vbatt of the battery 18, current Ibatt flowing through the battery 18, the inter-terminal voltage Vc of the charge capacitor 19b, and current Ic flowing through the charge capacitor 19b.

FIG. 7 illustrates the states of the switches and a flow of current when the external power supply 17 charges the battery 18 and the capacitor 22. The switches are sequentially set to the state of stage (1) illustrated in the upper part, the state of stage (2) illustrated in the middle part, and the state of stage (3) illustrated in the lower part in FIG. 7 during charge by the external power supply 17.

First, when the external power supply 17 starts charge at time $t_1$ in FIG. 6, the charge controller 19a turns on (closed state) the switches SWbatt and SWcap and turns off (open state) the switches SW1 to SW4. This puts the vehicle power supply system 10 in the state of stage (1) illustrated in the upper part in FIG. 7. In this state, the battery 18 and the capacitor 22 are connected to the external power supply 17 and the charging device 19 is disconnected from the external power supply 17. With this, the current supplied from the external power supply 17 flows into the capacitor 22 and the battery 18 (current Icap and current Ibatt>0) to charge the capacitor 22 and the battery 18. The inter-terminal voltage Vcap of the capacitor 22 and the inter-terminal voltage Vbatt of the battery 18 are raised accordingly. Since the electric charge storable in the capacitor 22 is less than the electric charge storable in the battery 18, the inter-terminal voltage Vcap of the capacitor 22 increases more immediately than the inter-terminal voltage Vbatt of the battery 18. Therefore, the inter-terminal voltage Vcap of the capacitor 22 is raised close to the rated voltage of the capacitor 22 at time $t_2$.

When the inter-terminal voltage Vcap of the capacitor 22 is raised, the charge controller 19a turns on the switches SW1 and SW3 at time $t_2$ (the switches SWbatt and SWcap stay on and the switches SW2 and SW4 stay off). This puts the vehicle power supply system 10 in the state of stage (2) illustrated in the middle part in FIG. 7. In this state, the current from the external power supply 17 flows into the charge capacitor 19b of the charging device 19 and the electric charge stored in the capacitor 22 is discharged (current Icap<0) and then flows into the charge capacitor 19b (current Ic>0). This raises the inter-terminal voltage Vc of the charge capacitor 19b and lowers the inter-terminal voltage Vcap of the capacitor 22. This puts the capacitor 22 in a chargeable state again. It should be noted here that the voltage that is the total of the inter-terminal voltage Vbatt of the battery 18 and the inter-terminal voltage Vcap of the capacitor 22 is kept at a voltage equal to or higher than the lower limit voltage above which charge by the external power supply 17 is enabled even in the state at time $t_3$ in which the voltage of the capacitor 22 is lowered.

When the inter-terminal voltage Vc of the charge capacitor 19b is raised to a predetermined voltage, the charge controller 19a turns off the switches SW1 and SW3 and turns on the switches SW2 and SW4 at time $t_3$ (the switches SWbatt and SWcap stay on). This puts the vehicle power supply system 10 in the state of stage (3) illustrated in the lower part in FIG. 7. In this state, the current from the external power supply 17 flows into the capacitor 22 and the battery 18 to charge the capacitor 22 and the battery 18. In addition, the electric charge stored in the charge capacitor 19b also passes through the switches SW2 and SWbatt to charge the battery 18. This raises the inter-terminal voltage Vcap of the capacitor 22 and the inter-terminal voltage Vbatt of the battery 18 and lowers the inter-terminal voltage Vc of the charge capacitor 19b.

When the inter-terminal voltage Vcap of the capacitor is raised close to the rated voltage, the charge controller 19a puts the vehicle power supply system 10 in the state of stage (2) illustrated in the middle part in FIG. 7 again by switching the switches at time $t_4$. In this state, the inter-terminal voltage Vcap of the capacitor 22 is lowered and the inter-terminal voltage Vc of the charge capacitor 19b is raised (the inter-terminal voltage Vbatt of the battery 18 is substantially constant). Next, the charge controller 19a switches the switches to the state of stage (3) illustrated in the lower part in FIG. 7 at time $t_5$, raises the inter-terminal voltages of the capacitor 22 and the battery 18, and lowers the inter-terminal voltage Vc of the charge capacitor 19b. After that, the charge controller 19a alternately switches between the state of stage (2) and the state of stage (3) and raises the inter-terminal voltage Vbatt of the battery 18 (charges the battery 18). When the inter-terminal voltage Vbatt of the battery 18 is raised to a charge end threshold and the inter-terminal voltage Vcap of the capacitor 22 is raised close to the rated voltage, the charge controller 19a ends the charge of the capacitor 22 and the battery 18.

Next, charging of the capacitor 22 with the electric charge stored in the battery 18 will be described with reference to FIGS. 8 and 9. It should be noted here that the operation illustrated in FIG. 8 and FIG. 9 is performed to enable charge by the external power supply 17 when the total of the inter-terminal voltage of the battery 18 and the inter-terminal voltage of the capacitor 22 is lowered to a value less than the lower limit voltage above which charge by the external power supply 17 is enabled. That is, since charge by the external power supply 17 is disabled when the total of the inter-terminal voltages of the battery 18 and the capacitor 22 is lowered to a value less than the lower limit voltage, the inter-terminal voltage is raised by charging the capacitor 22 to enable charge by the external power supply 17. In addition, the operation illustrated in FIGS. 8 and 9 is also performed to raise the inter-terminal voltage of the capacitor 22 when the electric charge stored in the capacitor 22 is lowered while the vehicle 1 is traveling. That is, since the voltage necessary to drive the sub-driving motors 20 cannot be obtained when the electric charge stored in the capacitor 22 is reduced during travel and the inter-terminal voltage is lowered, the necessary voltage is recovered by charging the capacitor 22.

FIG. 8 is a time chart illustrating the operation of the vehicle power supply system 10 when the battery 18 charges the capacitor 22. FIG. 8 illustrates, from the top, the total Vin of the inter-terminal voltages of the battery and the capacitor 22, the open-close states of the switches SWbatt and SWcap, the open-close states of the switches SW1 and SW3, and the open-close states of the switches SW2 and SW4. FIG. 8 further illustrates the inter-terminal voltage Vcap of the capacitor 22, the current Icap flowing through the capacitor 22, the inter-terminal voltage Vbatt of the battery 18, the current Ibatt flowing through the battery 18, the inter-terminal voltage Vc of the charge capacitor 19b, and the current Ic flowing through the charge capacitor 19b.

FIG. 9 illustrates the states of the switches and a flow of current when the capacitor 22 is charged with the electric charge of the battery 18. The switches are sequentially set to the state of stage (11) illustrated in the upper part, the state of stage (12) illustrated in the middle part, and the state of stage (13) illustrated in the lower part in FIG. 9 while the capacitor 22 is charged.

First, at time $t_{11}$ in FIG. 8, since the total Vin of the inter-terminal voltages of the battery 18 and the capacitor 22 is less than the lower limit voltage, the capacitor 22 is charged to increase the total voltage. The charge controller 19a turns on (closed state) the switches SWbatt and SWcap at time $t_{11}$ to start the charge of the capacitor 22. In addition, the charge controller 19a turns on the switches SW2 and SW4 at time $t_{12}$ (the switches SW1 and SW3 stay off (open state)). This puts the vehicle power supply system 10 in the state of stage (11) illustrated in the upper part in FIG. 9. In this state, the current (Ibatt<0) output from the battery 18 flows into the charge capacitor 19b of the charging device 19 (Ic>0) via the switch SWbatt and the switch SW2. This raises the inter-terminal voltage Vc of the charge capacitor 19b. In contrast, although the inter-terminal voltage Vbatt of the battery 18 is reduced, the amount of reduction is slight because sufficient electric charge is stored in the battery 18.

When the inter-terminal voltage Vc of the charge capacitor 19b is raised to a predetermined voltage, the charge controller 19a turns on the switches SW1 and SW3 at time $t_{13}$ and turns off the switches SW2 and SW4 (the switches SWbatt and SWcap stay on) at time $t_{13}$. This puts the vehicle power supply system 10 in the state of stage (12) illustrated in the middle part in FIG. 9. In this state, the current (current Ic<0) discharged from the charge capacitor 19b of the charging device 19 flows into the capacitor 22 (current Icap>0). This lowers the inter-terminal voltage Vc of the charge capacitor 19b and raises the inter-terminal voltage Vcap of the capacitor 22 (the inter-terminal voltage Vbatt of the battery 18 does not change). As a result, the total Vin of the inter-terminal voltages of the capacitor 22 and the battery 18 is raised.

When the inter-terminal voltage Vc of the charge capacitor 19b is lowered to a predetermined voltage, the charge controller 19a turns off the switches SW1 and SW3 and turns on the switches SW2 and SW4 at time $t_{14}$ (the switches SWbatt and SWcap stay on). This returns the vehicle power supply system 10 to the state of stage (11) illustrated in the upper part in FIG. 9. In this state, the current from the battery 18 flows into the charge capacitor 19b to charge the charge capacitor 19b as described above. This raises the inter-terminal voltage Vc of the charge capacitor 19b and slightly lowers the inter-terminal voltage Vbatt of the battery 18.

When the inter-terminal voltage Vc of the charge capacitor 19b is lowered to a predetermined voltage, the charge controller 19a puts the vehicle power supply system 10 in the state of stage (12) illustrated in the middle part in FIG. 9 again by switching the switches at time $t_{15}$. In this state, the inter-terminal voltage Vc of the charge capacitor 19b is lowered and the inter-terminal voltage Vcap of the capacitor 22 is raised (the inter-terminal voltage Vbatt of the battery 18 is substantially constant). As a result, the total Vin of the inter-terminal voltages of the capacitor 22 and the battery 18 is further raised. After that, the charge controller 19a alternately switches between the state of stage (11) and the state of stage (12) to raise the inter-terminal voltage Vcap of the capacitor 22 and the total Vin of the inter-terminal voltages of the capacitor 22 and the battery 18 (charge the capacitor 22). That is, the electric charge stored in the battery 18 is discharged and supplied to the capacitor 22 by alternately repeating stage (11) and stage (12) in FIG. 9, and the inter-terminal voltage Vcap of the capacitor 22 is raised. In contrast, although the electric charge of the battery 18 is discharged, reduction in the inter-terminal voltage of the battery 18 is slight because the capacity of the battery 18 is sufficiently large. Accordingly, the total Vin of the inter-terminal voltages of the capacitor 22 and the battery 18 can be raised by charging the capacitor 22 with the electric charge of the battery 18.

When the total of the inter-terminal voltages of the capacitor 22 and the battery 18 reaches an external charge start threshold at time $t_{18}$ in FIG. 8, the charge controller 19a starts charge from the external power supply 17 at time $t_{19}$. It should be noted here that the external charge start threshold is set to a value equal to or more than the lower limit voltage above which charge by the external power supply 17 is enabled. That is, the charge controller 19a turns on the switches SWbatt and SWcap and turns off the switches SW1 to SW4 at time $t_{19}$ to put the vehicle power supply system 10 in the state of stage (13) illustrated in the lower part in FIG. 9. With this, the current supplied from the external power supply 17 flows into the capacitor 22 and the battery 18, and the inter-terminal voltages of the capacitor 22 and the battery 18 are raised. It should be noted here that a shift is made to the operation described in FIGS. 6 and 7 when the inter-terminal voltage Vcap of the capacitor 22 reaches a predetermined voltage after time $t_{19}$ to charge the battery 18.

The operation described with reference to FIGS. 8 and 9 above is performed to raise the total of the inter-terminal voltages of the capacitor 22 and the battery 18 to a voltage equal to or more than the lower limit voltage above which charge from the external power supply is enabled. However, the operation described with reference to FIGS. 8 and 9 is also performed when the total of the inter-terminal voltages of the capacitor 22 and the battery 18 is raised to apply a necessary voltage to the sub-driving motors 20. In this case, the operation described with reference to FIG. 8 and FIG. 9 is also performed when the total of the inter-terminal voltages of the capacitor 22 and the battery 18 is higher than the lower limit voltage.

Next, the charging of the battery 18 with the electric charge stored in the capacitor 22 will be described with reference to FIGS. 10 and 11. It should be noted here that the operation illustrated in FIGS. 10 and 11 is performed when the inter-terminal voltage of the capacitor 22 is raised to a predetermined voltage or higher by charging the capacitor 22 with the electric power regenerated by the sub-driving motors 20. That is, when the inter-terminal voltage of the capacitor 22 is raised to the rated voltage or higher, the capacitor 22 may be degraded. Accordingly, the regenerated electric power is used effectively by charging the battery 18 with the electric charge stored in the capacitor 22.

FIG. 10 is a time chart illustrating the operation of the vehicle power supply system 10 when the capacitor 22 charges the battery 18. FIG. 11 illustrates, from the top, the total Vin of the inter-terminal voltages of the battery and the capacitor 22, the open-close states of the switches SWbatt and SWcap, the open-close states of the switches SW1 and SW3, and the open-close states of the switches SW2 and SW4. FIG. 11 further illustrates the inter-terminal voltage Vcap of the capacitor 22, the current Icap flowing through the capacitor 22, the inter-terminal voltage Vbatt of the battery 18, the current Ibatt flowing through the battery 18, the inter-terminal voltage Vc of the charge capacitor 19*b*, and the current Ic flowing through the charge capacitor 19*b*.

FIG. 11 illustrates the states of the switches and a flow of current when the battery 18 is charged with the electric charge of the capacitor 22. The switches are sequentially set to the state of stage (21) illustrated in the upper part in FIG. 11, the state of stage (22) illustrated in the middle part, and the state of stage (23) illustrated in the lower part while the battery 18 is charged.

First, since the inter-terminal voltage Vcap of the capacitor 22 is equal to or more than a predetermined voltage at time $t_{21}$ in FIG. 10, the capacitor 22 cannot be charged any more. Accordingly, the battery 18 is charged with the electric charge stored in the capacitor 22 to lower the inter-terminal voltage Vcap of the capacitor 22 so that the capacitor 22 can be charged with the electric power regenerated by the sub-driving motors 20. The charge controller 19*a* turns on the switches SW1 and SW3 at time $t_{22}$ (the switches SWbatt and SWcap stay ON (closed state) and the switches SW2 and SW4 stay off (open state)). This puts the vehicle power supply system 10 in the state of stage (21) illustrated in the upper part in FIG. 11. In this state, the current (Icap<0) discharged from the capacitor 22 flows into the charge capacitor 19*b* of the charging device 19 (Ic>0) via the switch SWcap and the switch SW1. This raises the inter-terminal voltage Vc of the charge capacitor 19*b* and lowers the inter-terminal voltage Vcap of the capacitor 22.

When the inter-terminal voltage Vc of the charge capacitor 19*b* is raised to a predetermined voltage, the charge controller 19*a* turns on the switches SW2 and SW4 and turns off the switches SW1 and SW3 at time $t_{23}$ (the switches SWbatt and SWcap stay on). This puts the vehicle power supply system 10 in the state of stage (22) illustrated in the middle part in FIG. 11. In this state, the current (current Ic<0) discharged from the charge capacitor 19*b* of the charging device 19 flows into the battery 18 (current Ibatt>0). This lowers the inter-terminal voltage Vc of the charge capacitor 19*b* and slightly raises the inter-terminal voltage Vbatt of the battery 18 (the inter-terminal voltage Vcap of the capacitor 22 does not change).

When the inter-terminal voltage Vc of the charge capacitor 19*b* is lowered to a predetermined voltage, the charge controller 19*a* turns on the switches SW1 and SW3 and turns off the switches SW2 and SW4 at time $t_{24}$ (the switches SWbatt and SWcap stay on). This returns the vehicle power supply system 10 to the state of stage (21) illustrated in the upper part in FIG. 11. In this state, the current from the capacitor 22 flows into the charge capacitor 19*b* to charge the charge capacitor 19*b* as described above. This raises the inter-terminal voltage Vc of the charge capacitor 19*b* and lowers the inter-terminal voltage Vcap of the capacitor 22.

When the inter-terminal voltage Vc of the charge capacitor 19*b* is lowered to a predetermined voltage, the charge controller 19*a* switches the switches at time $t_{25}$ and puts the vehicle power supply system 10 in the state of stage (22) illustrated in the middle part in FIG. 11 again. In this state, the inter-terminal voltage Vc of the charge capacitor 19*b* is lowered and the inter-terminal voltage Vbatt of the battery 18 is raised slightly. After that, the charge controller 19*a* alternately switches between the state of stage (21) and the state of stage (22), charges the battery 18 with the electric charge stored in the capacitor 22, and lowers the inter-terminal voltage Vcap of the capacitor 22. That is, the charge controller 19*a* lowers the inter-terminal voltage Vcap of the capacitor 22 by alternately repeating stage (21) and stage (22) in FIG. 11, and returns the electric power regenerated by the sub-driving motors 20 to the state chargeable in the capacitor 22.

When the inter-terminal voltage Vcap of the capacitor or the total of the inter-terminal voltages of the capacitor 22 and the battery 18 are lower to a discharge end threshold voltage set for each of the voltages at time $t_{28}$ in FIG. 10, the charge controller 19*a* puts the vehicle power supply system 10 in the state of stage (23) illustrated in the lower part in FIG. 11. That is, the charge controller 19*a* turns off the switches SWbatt and SWcap and turns off the switches SW1 to SW4 at time $t_{29}$ to put the vehicle power supply system 10 in a waiting state.

In the vehicle power supply system 10 according to the first embodiment of the present disclosure, the battery 18 and the capacitor 22 are electrically connected in series (FIG. 5) and the total of the rated voltage of the battery 18 and the rated voltage of the capacitor 22 is higher than the lower limit voltage. As a result, the external power supply 17 can charge the battery 18 and the capacitor 22 connected in series by directly connecting the external power supply 17 to the battery 18 and the capacitor 22 and the battery 18 having a low rated voltage can be charged effectively without use of a special voltage converter.

In addition, since the rated voltage of the capacitor 22 is higher than the rated voltage of the battery 18 in the vehicle power supply system 10 according to the embodiment, the rated voltage of the battery 18 can be greatly raised by the capacitor 22 connected in series to the battery 18, thereby enabling use of the battery 18 having a lower rated voltage.

In addition, since the positive terminal of the battery and the negative terminal of the capacitor 22 are connected to each other in the vehicle power supply system 10 according to the embodiment, charge can be performed by connecting the external power supply 17 between the positive terminal of the capacitor 22 and the negative terminal of the battery 18. In addition, by setting the negative terminal of the battery 18 to the ground potential of the vehicle, it is possible to drive a load drivable at a low voltage using only the electric power stored in the battery 18.

In addition, in the vehicle power supply system 10 according to the embodiment, since the electric charge storable in the capacitor 22 is less than the electric charge storable in the battery 18, the inter-terminal voltage of the capacitor 22 can be made high with relatively low electric charge, that is, the voltage can be greatly raised with relatively low electric charge.

In addition, in the vehicle power supply system 10 according to the embodiment, since the external power supply 17 can be connected to the power feeding port 23, which is a power feeding device, via the electric cable 17*a*, the external power supply 17 can charge the battery 18 and the capacitor 22 in a very simple structure.

Next, a vehicle power supply system according to a second embodiment of the present disclosure will be described with reference to FIGS. 12 and 13.

The vehicle power supply system according to the embodiment is different from that in the first embodiment in that the charging device 19 provided in the first embodiment is not present. Accordingly, only the differences between the embodiment and the first embodiment will be described below and the structure, operation, and effects similar to those of the first embodiment are not described. FIG. 12 illustrates the circuit of a vehicle power supply system 100 according to the second embodiment of the present disclosure. FIG. 13 illustrates changes in the inter-terminal voltages and the charge current when the vehicle power supply system 100 according to the embodiment is charged by the external power supply.

Figure 12:
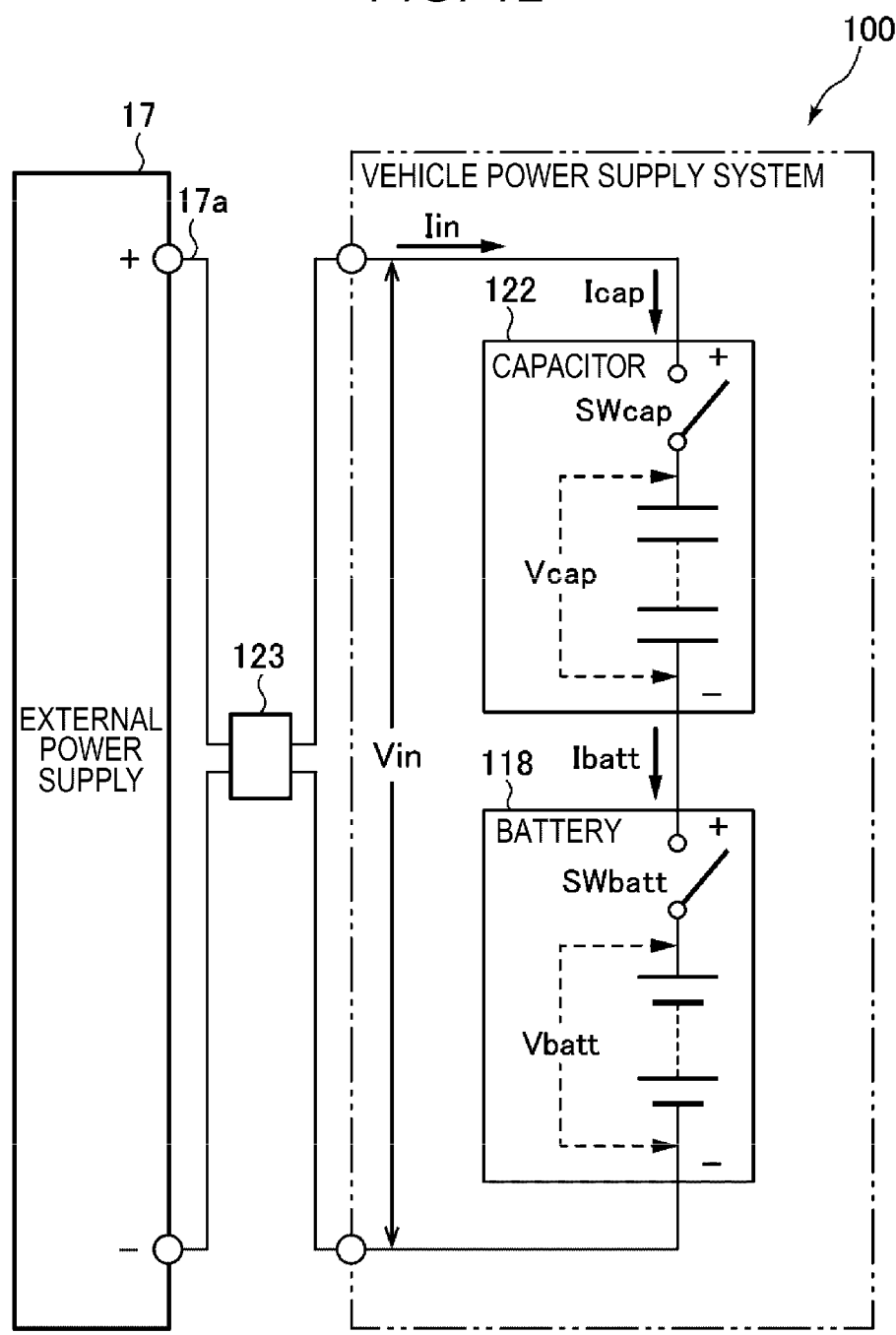
FIG. 12 illustrates the circuit of a vehicle power supply system according to a second embodiment of the present disclosure.

As illustrated in FIG. 12, the vehicle power supply system 100 according to the embodiment includes a battery 118, a capacitor 122, and a power feeding port 123 that is a power feeding device. In the embodiment, the battery 118 and the capacitor 122 are electrically connected in series by connecting the positive terminal of the battery 118 and the negative terminal of the capacitor 122 to each other. In addition, the positive terminal of the capacitor 122 and the negative terminal of the battery 118 are connected to the positive terminal and the negative terminal of the external power supply 17, respectively, via the power feeding port 123. It should be noted here that, as in the first embodiment described above, the rated voltage of the battery 118 is lower than the lower limit voltage above which charge by the external power supply 17 is enabled and the total of the rated voltage of the battery 118 and the rated voltage of the capacitor 122 is higher than the lower limit voltage.

In addition, the battery 118 has the switch SWbatt and the capacitor 122 has the switch SWcap so as to switch between the connection and disconnection of the battery 118 and the capacitor 122. In the case of charge, the switches SWbatt and SWcap are turned on (closed state). This directly applies the output voltage of the external power supply 17 between the positive terminal of the capacitor 122 and the negative terminal of the battery 118 so that the battery 118 and the capacitor 122 can be charged.

Figure 13:
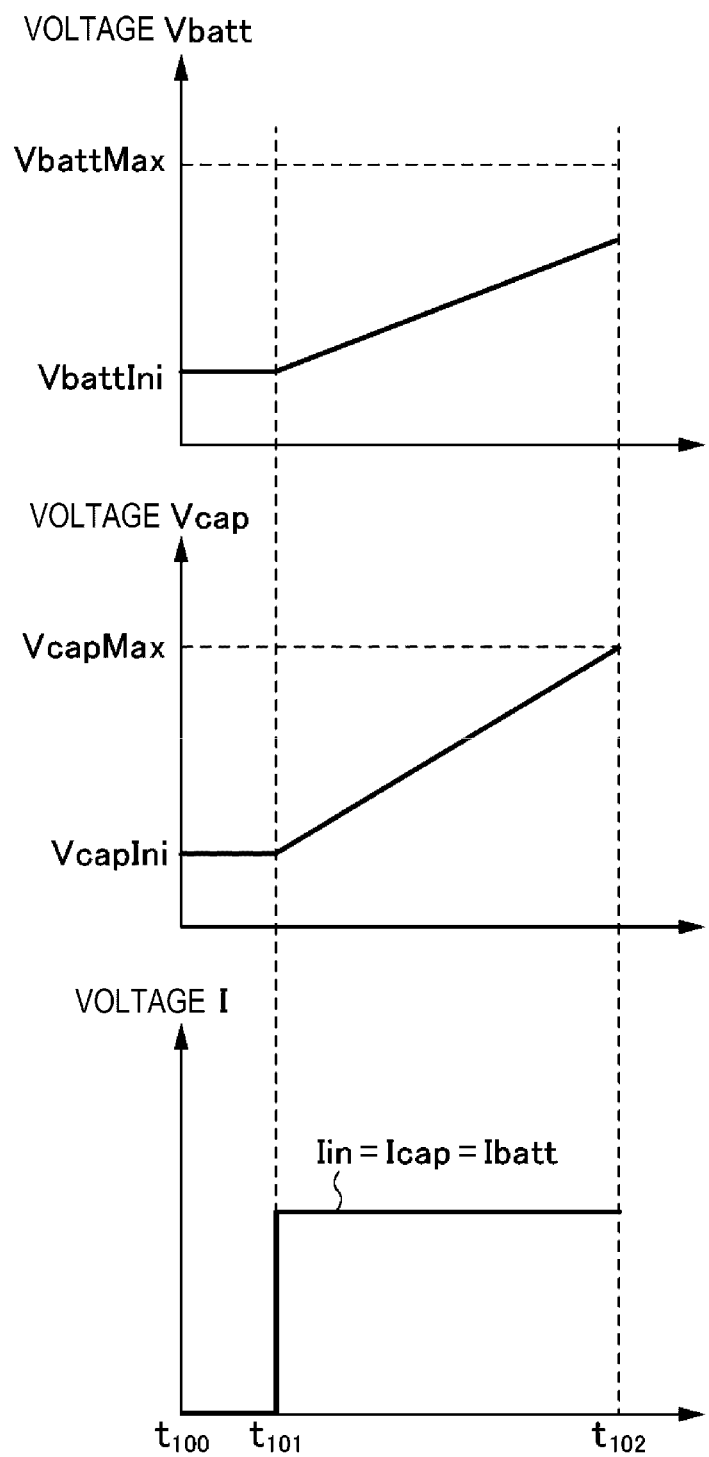
FIG. 13 illustrates changes in the inter-terminal voltages and the charge current during charge from the external power supply in the vehicle power supply system according to the second embodiment of the present disclosure.

FIG. 13 illustrates a time chart of the inter-terminal voltage of the battery 118 in the upper part, a time chart of the inter-terminal voltage of the capacitor 122 in the middle part, and a time chart of the charge current in the lower part during charge by the external power supply 17. The time charts in upper part and the middle part in FIG. 13 represent temporal changes in the inter-terminal voltage Vbatt of the battery 118 and temporal changes in the inter-terminal voltage Vcap of the capacitor 122 during charge, respectively. The initial inter-terminal voltages VbattIni and VcapIni at time $t_{100}$ represent the inter-terminal voltages of the battery 118 and the capacitor 122 immediately before starting of charge, respectively. It should be noted here that the total of the inter-terminal voltage VbattIni of the battery 118 and the inter-terminal voltage VcapIni of the capacitor 122 is higher than the lower limit voltage above which charge by the external power supply 17 is enabled, at time $t_{100}$. In addition, VbattMax represents the upper limit voltage chargeable in the battery 118 in the time chart in the upper part and VcapMax represents the upper limit voltage chargeable in the capacitor 122 in the time chart in the middle part.

When charge is started at time $t_{101}$ in FIG. 13, as illustrated in the time chart in the lower part, current Iin flowing out of the external power supply 17, the current Icap flowing into the capacitor 122, and the current Ibatt flowing into the battery 118 are the same and have a fixed value. When the current flows into the capacitor 122 and the battery 118, the inter-terminal voltages Vbatt and Vcap are raised after the capacitor 122 and the battery 118 are charged. In the example illustrated in FIG. 13, after starting of charge, the inter-terminal voltage Vcap of the capacitor 122 reaches the upper limit voltage VcapMax at time $t_{102}$. Accordingly, since the capacitor 122 may be degraded by further charge, the charge is completed at time $t_{102}$. However, since the inter-terminal voltage Vbatt of the battery 118 does not reach the upper limit voltage VbattMax yet at time $t_{102}$, the battery 118 is not fully charged.

Since the vehicle power supply system 100 according to the embodiment may have a very simple structure as described above, it is difficult to fully charge the capacitor 122 and the battery 118 at the same time. However, by setting the charge capacity of the capacitor 122 and the battery 118, the vehicle power supply system may be configured so that the capacitor 122 and the battery 118 can be substantially fully charged at the same time.

The vehicle power supply system according to the second embodiment of the present disclosure has a simple structure and can charge the battery 118 having a rated voltage lower than the lower limit voltage above which charge by the external power supply 17 is enabled without using a voltage converting apparatus or the like.

Next, a vehicle power supply system according to a third embodiment of the present disclosure will be described with reference to FIGS. 14 and 15.

The vehicle power supply system according to the embodiment is different from that in the first embodiment in that a bypass device is provided in place of the charging device 19 included in the first embodiment. Accordingly, only the differences between the embodiment and the first embodiment will be described below and the structure, operation, and effects similar to those of the first embodiment are not described. FIG. 14 illustrates the circuit of a vehicle power supply system 200 according to the third embodiment of the present disclosure. FIG. 15 illustrates changes in the inter-terminal voltage and the charge current when the vehicle power supply system 200 according to the embodiment is charged by the external power supply.

Figure 14:
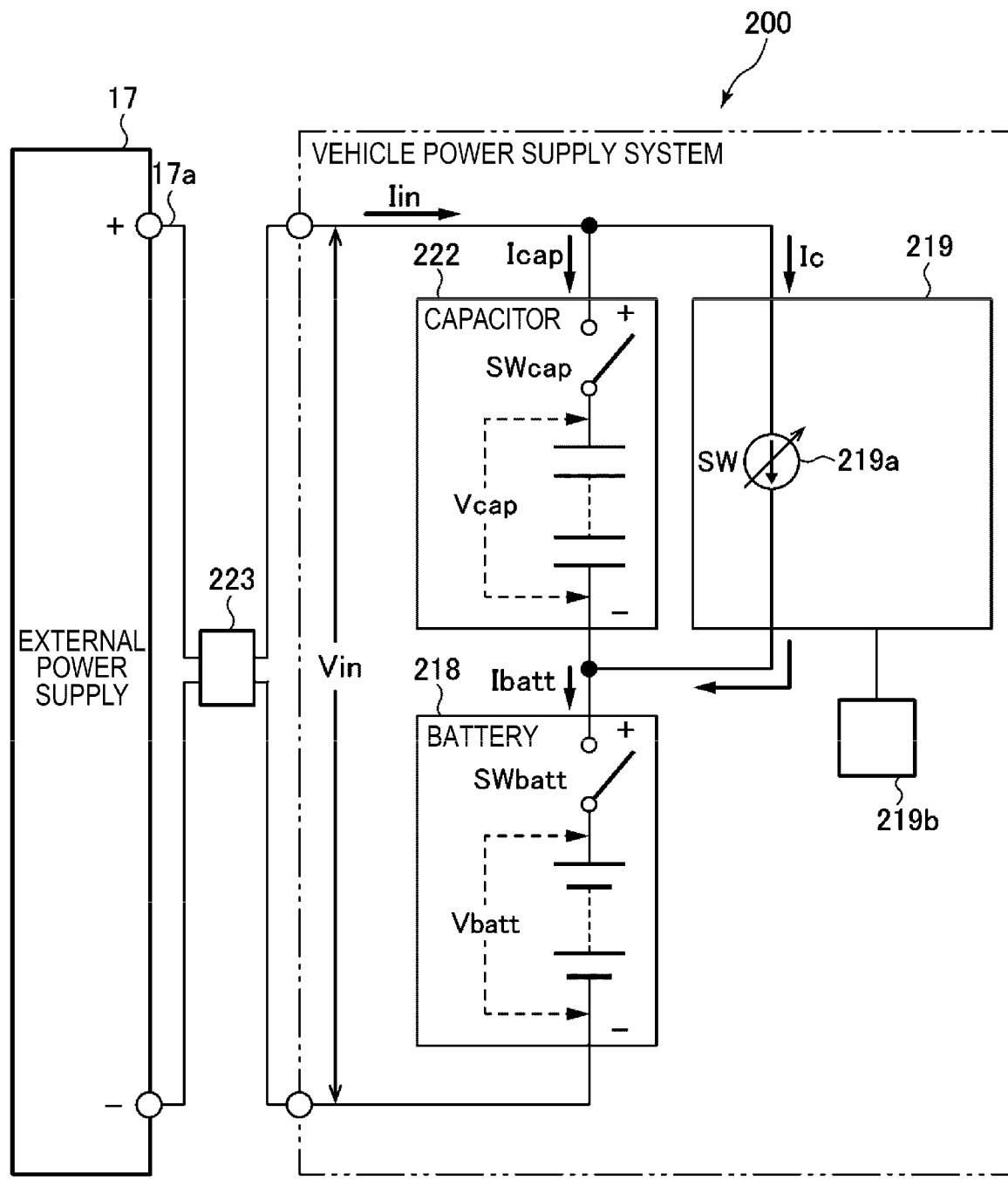
FIG. 14 illustrates the circuit of a vehicle power supply system according to a third embodiment of the present disclosure.

As illustrated in FIG. 14, the vehicle power supply system 200 according to the embodiment includes a battery 218, a capacitor 222, and a bypass device 219 and a power feeding port 223 that function as a power feeding device. In the embodiment, the battery 218 and the capacitor 222 are electrically connected in series by connecting the positive terminal of the battery 218 and the negative terminal of the capacitor 222 to each other. In addition, the positive terminal of the capacitor 222 and the negative terminal of the battery 218 are connected to the positive terminal and the negative terminal of the external power supply 17, respectively, via the power feeding port 223. In addition, the battery 218 has the switch SWbatt and the capacitor 222 has the switch SWcap so as to switch between the connection and disconnection of the battery 218 and the capacitor 222. It should be noted here that, as in the first embodiment described above, the rated voltage of the battery 218 is lower than the lower limit voltage above which charge by the external power supply 17 is enabled and the total of the rated voltage of the battery 218 and the rated voltage of the capacitor 222 is higher than the lower limit voltage.

The bypass device 219 is connected to the capacitor 222 in parallel and includes a current adjusting unit 219a. This current adjusting unit 219a can set the current passing through the bypass device 219 and the current Ic passing through the current adjusting unit 219a is controlled by a charge controller 219b. That is, the current Iin having flowed into the vehicle power supply system 200 via the power feeding port 223 is divided into the current Icap flowing into the capacitor 222 and the current Ic passing through the current adjusting unit 219a. In addition, the current Icap having flowed into the capacitor 222 and the current Ic having passed through the current adjusting unit 219a merge with each other again and the merging current flows into the battery 218 as the current Ibatt. Accordingly, the following relationship holds among these current values: Iin=Icap+Ic=Ibatt.

In FIG. 15, the time chart in the upper part illustrates the inter-terminal voltage of the battery 218, the time chart in the middle part illustrates the inter-terminal voltage of the capacitor 222, and the time chart in the lower part illustrates the charge current during charge by the external power supply 17. The time charts in the upper part and the middle part in FIG. 15 represent temporal changes in the inter-terminal voltage Vbatt of the battery 218 and temporal changes in the inter-terminal voltage Vcap of the capacitor 222 during charge, respectively. The initial inter-terminal voltages VbattIni and VcapIni at time $t_{200}$ represent the inter-terminal voltages of the battery 218 and the capacitor 222 immediately before starting of charge, respectively. It should be noted here that the total of the inter-terminal voltage VbattIni of the battery 118 and the inter-terminal voltage VcapIni of the capacitor 122 is higher than the lower limit voltage above which charge by the external power supply 17 is enabled, at time $t_{200}$. In addition, VbattMax represents the upper limit voltage chargeable in the battery 218 in the time chart in the upper part and VcapMax represents the upper limit voltage chargeable in the capacitor 222 in the time chart in the middle part.

When charge is started at time $t_{201}$ in FIG. 15, as illustrated in the time chart in the lower part, the certain current Iin flows into the vehicle power supply system 200 from the external power supply 17. Since the current Iin is divided into the current Icap flowing into the capacitor 222 and the current Ic passing through the current adjusting unit 219a, the divided current is constant current less than the current Iin. In addition, the constant current Ibatt that is equal to the current Iin flows into the battery 218. In addition, when the current flows into the capacitor 222 and the battery 218 and the capacitor 222 and the battery 218 are charged, the inter-terminal voltages Vbatt and Vcap are raised as illustrated in the upper part and the middle part in FIG. 15.

As described above, the capacitor 222 is charged with charge current lower than in the battery 218. Accordingly, it is possible to prevent the inter-terminal voltage Vcap of the capacitor 222 from reaching the upper limit voltage VcapMax before the inter-terminal voltage Vbatt of the battery 218 reaches the upper limit voltage VbattMax. In the example illustrated in FIG. 15, after charge is started, at time $t_{202}$, the inter-terminal voltage Vcap of the capacitor 222 and the inter-terminal voltage Vbatt of the battery 218 reach the upper limit voltages VcapMax and VbattMax substantially at the same time. With this, the battery 218 and the capacitor 222 are fully charged substantially at the same time at time $t_{202}$ and the charge can be completed.

It should be noted here that the current value required to fully charge the battery 218 and the capacitor 222 at the same time depends on the inter-terminal voltages VbattIni and VcapIni of the battery 218 and the capacitor 222 at an initial stage of charge. The charge controller 219b sets the appropriate bypass current Ic according to the inter-terminal voltages of the battery 218 and the capacitor 222 at the start of charge so that the battery 218 and the capacitor 222 are fully charged substantially at the same time.

In the embodiment, as illustrated in the lower part in FIG. 15, each of the battery 218 and the capacitor 222 is charged with constant current. In a modification, the charge controller 219b may change the bypass current Ic based on increase in the inter-terminal voltages of the battery 218 and the capacitor 222 that are being charged. According to this modification, the battery 218 and the capacitor 222 can be fully charged at the same time more surely.

The vehicle power supply system 200 according to the third embodiment of the present disclosure can fully charge the battery 218 and the capacitor 222 surely in a simple structure.

Although embodiments of the present disclosure have been described above, various modifications can be made to these embodiments. In particular, although the vehicle power supply system is used to drive the main driving motor and the sub-driving motors of the vehicle in the embodiments described above, the vehicle power supply system according to the present disclosure may supply electric power to any electric devices installed in the vehicle. In addition, although the vehicle power supply system is charged by connecting the electric cable of the external power supply to the power feeding port, which is the power feeding device of the vehicle power supply system, in the above embodiment, the present disclosure may be configured so that the vehicle power supply system is charged by the external power supply in a non-contact manner while the vehicle stops or is traveling. In this case, the vehicle power supply system only needs to have a power feeding device capable of receiving electric power from the external power supply in a non-contact manner. Furthermore, although the present disclosure is applied to the vehicle power supply system having a battery with a rated voltage of 48 V in the embodiments described above, the present disclosure may be applied to a battery with a nominal voltage lower than the lower limit voltage.

DESCRIPTION OF REFERENCE SIGNS AND NUMERALS

1: vehicle
2a: rear wheel
2b: front wheel
10: vehicle power supply system
12: engine
14: power transmission mechanism
14a: propeller shaft
14b: transmission
16: main driving motor
16a: inverter
17: external power supply
17a: electric cable
18: battery
19: charging device (power feeding device)
19a: charge controller
19b: charge capacitor
20: sub-driving motor
20a: inverter
22: capacitor
23: power feeding port (power feeding device)
24: control device
26: DC-to-DC converter
28: vehicle-mounted device
100: vehicle power supply system
118: battery
122: capacitor
123: power feeding port (power feeding device)
200: vehicle power supply system
218: battery
222: capacitor
219: bypass device (power feeding device)

219a: current adjusting unit
219b: charge controller
223: power feeding port (power feeding device)

The invention claimed is:

1. A vehicle power supply system configured to be charged by an electric vehicle (EV) charging station that performs charging with a voltage equal to or more than a predetermined lower limit voltage, the vehicle power supply system comprising:
  a battery having a rated voltage lower than the lower limit voltage;
  a capacitor electrically connected in series to the battery, wherein a sum of the rated voltage of the battery and a rated voltage of the capacitor is greater than the predetermined lower limit voltage;
  an interface configured to receive electric power from the EV charging station; and
  circuitry configured to
    receive electric power from the EV charging station; and
    charge the battery and the capacitor using the received electric power.

2. The vehicle power supply system of claim 1, wherein the predetermined lower limit voltage is 50 V.

3. The vehicle power supply system of claim 1, wherein the rated voltage of the capacitor is higher than the rated voltage of the battery.

4. The vehicle power supply system of claim 3, wherein the rated voltage of the capacitor is 72 V.

5. The vehicle power supply system of claim 3, wherein the rated voltage of the battery is 48 V.

6. The vehicle power supply system of claim 1, wherein the battery and the capacitor are connected in series by connecting a positive terminal of the battery to a negative terminal of the capacitor.

7. The vehicle power supply system of claim 1, wherein electric charge storable in the capacitor is less than electric charge storable in the battery.

8. The vehicle power supply system of claim 1, further comprising:
  a DC-to-DC converter electrically connected to the battery and the capacitor.

9. The vehicle power supply system of claim 1, wherein the EV charging station is connected to an external power supply via an electric cable.

10. The vehicle power supply system of claim 1, wherein the circuitry comprises:
  a DC-to-DC converter configured to decrease a voltage of electric charge stored in the capacitor and charge the battery with the decreased voltage.

11. The vehicle power supply system of claim 1, wherein the circuitry comprises:
  a DC-to-DC converter configured to increase a voltage of electric charge stored in the battery and charge the capacitor with the increased voltage.

12. The vehicle power supply system of claim 1, further comprising:
  a first switch connected to a positive terminal of the battery; and
  a second switch connected to a positive terminal of the capacitor.

13. The vehicle power supply system of claim 1, wherein the circuitry is connected in parallel to the battery and the capacitor connected in series.

14. The vehicle power supply system of claim 13, wherein the circuitry comprises:
  a second capacitor;
  a first switch;
  a second switch;
  a third switch; and
  a fourth switch, wherein
  a first end of the first switch is connected to a positive terminal of the battery and a second end of the switch is connected to a first terminal of the second capacitor,
  a first end of the second switch is connected to the second end of the first switch and a second end of the second switch is connected to a connection point between a negative terminal of the capacitor and a positive terminal of the battery,
  a first end of the third switch is connected to the connection point between the negative terminal of the capacitor and the positive terminal of the battery and a second end of the third switch is connected to a second terminal of the second capacitor, and
  a first end of the fourth switch is connected to the second terminal of the second capacitor and a second end of the fourth switch is connected to a negative terminal of the battery.

15. The vehicle power supply system of claim 14, wherein the circuitry comprises a controller configured to control a state of the first switch, the second switch, the third switch and the fourth switch based on an operational status of the battery and the capacitor.

16. The vehicle power supply system of claim 14, wherein in a case that the interface is receiving power from the EV charging station, the controller controls the first switch, the second switch, the third switch and the fourth switch to be in an open state so that power flows from the interface to the battery and the capacitor.

17. The vehicle power supply system of claim 14, wherein in a case that the interface is receiving power from the EV charging station and the capacitor is charged above a threshold value, the controller is configured to control the first switch and the third switch to be in a closed state and the second switch and the fourth switch to be in an open state so that power flows from the capacitor and the interface to the second capacitor.

18. The vehicle power supply system of claim 14, wherein in a case that the interface is receiving power from the EV charging station and the second capacitor is charged above a threshold value, the controller is configured to control the first switch and the third switch to be in an open state and the second switch and the fourth switch to be in a closed state so that power flows from the interface to the capacitor and battery and from the second capacitor to the battery.

19. A vehicle configured to be charged by an electric vehicle (EV) charging station that performs charging with a voltage equal to or more than a predetermined lower limit voltage, the vehicle comprising:
  a driving motor configured to generate driving force to be applied to a plurality of wheels of the vehicle;
  a battery having a rated voltage lower than the lower limit voltage and configured to provide power to the driving motor;
  a capacitor electrically connected in series to the battery, wherein a sum of the rated voltage of the battery and a rated voltage of the capacitor is greater than the predetermined lower limit voltage;

an interface configured to receive electric power from the EV charging station; and circuitry configured to
- receive electric power from the EV charging station; and
- charge the battery and the capacitor using the received electric power.

20. A vehicle power supply system configured to be charged by an electric vehicle (EV) charging station that performs charging with a voltage equal to or more than a predetermined lower limit voltage; the vehicle power supply system comprising:

- a battery having a rated voltage lower than the lower limit voltage;
- a capacitor electrically connected in series to the battery, wherein a sum of the rated voltage of the battery and a rated voltage of the capacitor is greater than the predetermined lower limit voltage;
- an interface configured to receive electric power from the EV charging station; and
- means for receiving electric power from the EV charging station, and charging the battery and the capacitor using the received electric power.

\* \* \* \* \*